United States Patent
Nishiyama et al.

(10) Patent No.: US 9,735,635 B2
(45) Date of Patent: Aug. 15, 2017

(54) PERMANENT MAGNET SYNCHRONOUS MACHINE

(71) Applicant: Panasonic Intellectual Property Management Co., Ltd., Osaka (JP)

(72) Inventors: Noriyoshi Nishiyama, Osaka (JP); Osao Kido, Kyoto (JP); Atsuo Okaichi, Osaka (JP); Takumi Hikichi, Osaka (JP); Yoshio Tomigashi, Osaka (JP); Tetsuya Matsuyama, Nara (JP); Masaaki Konoto, Kyoto (JP); Osamu Kosuda, Osaka (JP); Subaru Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 492 days.

(21) Appl. No.: 14/556,165

(22) Filed: Nov. 30, 2014

(65) Prior Publication Data

US 2015/0171679 A1 Jun. 18, 2015

(30) Foreign Application Priority Data

Dec. 12, 2013 (JP) ................................. 2013-257284

(51) Int. Cl.
*H02K 21/12* (2006.01)
*H02K 1/27* (2006.01)
*H02K 21/14* (2006.01)

(52) U.S. Cl.
CPC ........... *H02K 1/278* (2013.01); *H02K 1/2766* (2013.01); *H02K 1/2786* (2013.01); *H02K 21/14* (2013.01)

(58) Field of Classification Search
CPC ......... H02K 1/2766; H02K 1/278; H02K 1/27
(Continued)

(56) References Cited

U.S. PATENT DOCUMENTS

| | | | | |
|---|---|---|---|---|
| 6,323,572 B1 * | 11/2001 | Kinoshita | ............ | H02K 1/2766 310/156.07 |
| 7,723,887 B2 * | 5/2010 | Yang | ..................... | H02K 1/278 310/156.01 |

(Continued)

FOREIGN PATENT DOCUMENTS

| | | |
|---|---|---|
| JP | 2006-211801 | 8/2006 |
| JP | 2012-186901 | 9/2012 |
| JP | 2012-249389 | 12/2012 |

*Primary Examiner* — Thanh Lam
(74) *Attorney, Agent, or Firm* — Wenderoth, Lind & Ponack, L.L.P.

(57) ABSTRACT

A permanent magnet synchronous machine includes a rotor including a core body and an overhang protruding further in an axial direction than a core of a stator. An end surface of the core body includes an N-region disposed on a north pole and an S-region disposed on a south pole. The overhang includes first permanent magnets arranged along an outer edge of the end surface with distances therebetween and a plurality of second permanent magnets disposed on the end surface and adjacent to the first permanent magnets. The first permanent magnets include at least one of a permanent magnet comprising a north pole facing the N-region and a permanent magnet comprising a south pole facing the S-region. The second permanent magnets are provided in the configuration which causes the second permanent magnets to generate a magnetic flux extending from the S-region toward the N-region.

12 Claims, 18 Drawing Sheets

(58) Field of Classification Search
USPC ...... 310/156.43, 156.01–156.84, 216.1, 265, 310/270
See application file for complete search history.

(56) References Cited

U.S. PATENT DOCUMENTS

| | | | | |
|---|---|---|---|---|
| 7,969,056 | B2* | 6/2011 | Mizutani | H02K 21/046 310/156.07 |
| 2013/0049513 | A1* | 2/2013 | El-Refaie | H02K 21/16 310/156.43 |
| 2013/0313932 | A1* | 11/2013 | Shibata | H02K 1/2773 310/156.07 |
| 2014/0084731 | A1* | 3/2014 | Iwami | H02K 1/278 310/156.07 |

* cited by examiner

PERMANENT MAGNET SYNCHRONOUS MACHINE

BACKGROUND

1. Technical Field

The present disclosure relates to a permanent magnet synchronous machine including a rotor and a stator.

2. Description of the Related Art

Permanent magnet synchronous machines are synchronous machines including a rotor having a permanent magnet and a stator having a coil. The term "synchronous machine" is the generic term for motors, generators, and any electric machines including a combination of motors and generators. Accordingly, in the present disclosure, the term "permanent magnet synchronous machine" is not limited to one of "motor" and "generator".

Concentrated-winding coils have been widely used in permanent magnet synchronous machines that are used in applications where reduction in the size of permanent magnet synchronous machines is needed. This is because, by using concentrated-winding coils, it is possible to reduce the length of coil ends of a stator (end portions of a coil protruding from a stator core in the axial direction) in the axial direction. In existing permanent magnet synchronous machines, the length of a core (iron core) body of a rotor in the axial direction is shorter than the length of a stator, including coil ends, in the axial direction. In this case, a space in the stator surrounded by each coil end, that is, a space on an inner peripheral side of each coil end, is an unused space.

A small and high-power permanent magnet synchronous machine has been proposed in which an overhang of a rotor is disposed in the unused space (Japanese Unexamined Patent Application Publication No. 2012-186901). Due to the presence of the overhang, the length of the rotor in the axial direction is increased, and therefore the amount of effective magnetic flux into a core body of the rotor (hereinafter referred to only as the "amount of effective magnetic flux") is increased.

Japanese Unexamined Patent Application Publication No. 2006-211801 discloses a permanent magnet embedded motor that reduces an effect of magnetic saturation at an outer periphery of an overhang of a rotor core.

SUMMARY

Existing technologies have a problem in that the amount of effective magnetic flux decreases if the length of an overhang of a rotor in the axial direction is small.

Under the above circumstances, one non-limiting and exemplary embodiment provides a permanent magnet synchronous machine that can increase the amount of effective magnetic flux as compared with existing machines even if the length of an overhang of a rotor in the axial direction is small.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to one non-limiting exemplary embodiment of the present disclosure, a permanent magnet synchronous machine includes a stator, and a rotor including a plurality of magnetic poles each facing the stator with an air gap therebetween and each generating a magnetic flux in a radial direction. The stator includes a core including a plurality of teeth, and a coil wound around each of the plurality of teeth. The rotor includes a core body having a pair of end surfaces perpendicular to a rotation axis and a surface on which a north pole and a south pole included in the plurality of magnetic poles are alternately arranged in a circumferential direction, and an overhang disposed on each end surface of the core body and protruding further in a direction of the rotation axis than the core of the stator. Each end surface of the core body includes an N-region located on the north pole included in the magnetic poles, and an S-region located on the south pole included in the magnetic poles. The overhang includes a plurality of first permanent magnets arranged on the end surface of the core body along an outer edge of the end surface with distances therebetween, and a plurality of second permanent magnets disposed on the end surface of the core body and adjacent to the first permanent magnets. The plurality of first permanent magnets include at least one of a permanent magnet having a north pole facing the N-region of the end surface, and a permanent magnet having a south pole facing the S-region of the end surface. The second permanent magnets are provided in the configuration which cause the second permanent magnets to generate a magnetic flux extending from the S-region toward the N-region of the end surface.

These general and specific aspects may be implemented using a system and a method, and any combination of systems and methods.

With the permanent magnet synchronous machine according to the present disclosure, it is possible to increase the amount of effective magnetic flux as compared with existing machines even if the length of an overhang of a rotor in the axial direction is small.

DETAILED DESCRIPTION

Figure 21:
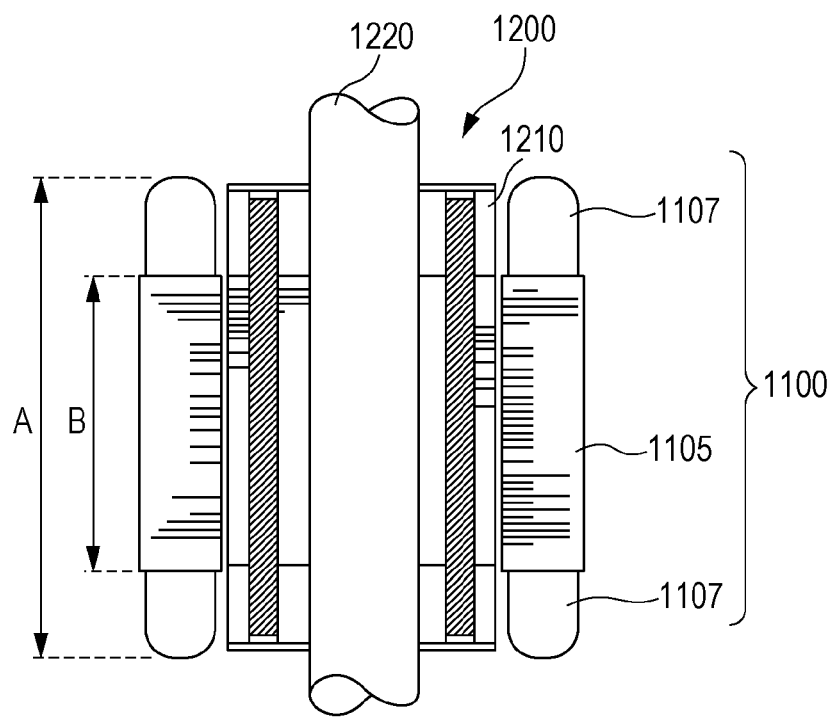
FIG. 21 is an axial sectional view of a rotor of an existing permanent magnet synchronous machine.

FIG. 21 is an axial sectional view illustrating an example of a structure disclosed in Japanese Unexamined Patent Application Publication No. 2012-186901. In the permanent magnet synchronous machine illustrated in FIG. 21, a stator 1100 surrounds a rotor 1200, and the rotor 1200 rotates around a rotation shaft 1220. Coil ends 1107 protrude from a core 1105 of the stator 1100 in the axial direction, and overhangs 1210 of the rotor 1200 are disposed in spaces on inner peripheral sides of the coil ends 1107. The length A of the stator 1100 including the coil ends 1107 is larger than the length B of the core of the stator 1100 by the lengths of the coil ends 1107 in the axial direction. The length of the rotor 1200 including the overhangs 1210 is substantially the same as the length A of the stator 1100. Due to the presence of the overhangs 1210, the amount of effective magnetic flux into the core of the rotor 1200 is increased.

Figure 22:
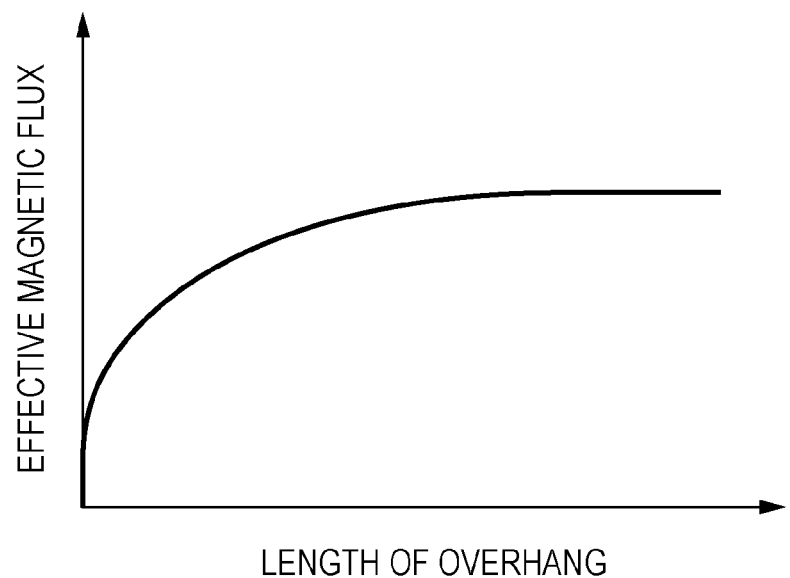
FIG. 22 is a graph representing the relationship between the length of an overhang in the axial direction and the amount of effective magnetic flux of the existing permanent magnet synchronous machine.

FIG. 22 is a graph representing the relationship between the length of the overhang 1210 (in the axial direction) and the effective magnetic flux. As can be seen from FIG. 22, the effective magnetic flux decreases sharply when the length of the overhang 1210 of the rotor 1200 becomes small.

The inventors found that it is possible to increase the amount of effective magnetic flux into the rotor core by providing the overhang of the rotor with permanent magnets that generate magnetic fluxes in different directions.

A first aspect of the present disclosure provides a permanent magnet synchronous machine including a stator, and a rotor including a plurality of magnetic poles each facing the stator with an air gap therebetween and each generating a magnetic flux in a radial direction. The stator includes a core including a plurality of teeth, and a coil wound around each of the plurality of teeth. The rotor includes a core body comprising a pair of end surfaces perpendicular to a rotation axis and a surface on which a north pole and a south pole included in the plurality of magnetic poles are alternately arranged in a circumferential direction, and an overhang disposed on each end surface of the core body and protruding further in a direction of the rotation axis than the core of the stator. Each end surface of the core body includes an N-region located on the north pole included in the magnetic poles, and an S-region located on the south pole included in the magnetic poles. The overhang includes a plurality of first permanent magnets arranged on the end surface of the core body along an outer edge of the end surface with distances therebetween, and a plurality of second permanent magnets disposed on the end surface of the core body and adjacent to the first permanent magnets. The plurality of first permanent magnets include at least one of a permanent magnet comprising a north pole facing the N-region of the end surface, and a permanent magnet comprising a south pole facing the S-region of the end surface. The second permanent magnets are provided in the configuration which causes the second permanent magnets to generate a magnetic flux extending from the S-region toward the N-region of the end surface.

A second aspect of the present disclosure provides the permanent magnet synchronous machine according to the first aspect, in which the rotor further includes a rotor yoke that covers sides of the plurality of first permanent magnets, the sides being opposite to sides facing the end surface, and the rotor yoke magnetically couples the plurality of first permanent magnets to each other.

A third aspect of the present disclosure provides the permanent magnet synchronous machine according to the second aspect, in which the rotor further includes a rotor end plate that is cup-shaped and made of a nonmagnetic material, and the rotor end plate has a groove that holds the first permanent magnets, the second permanent magnet, and the rotor yoke.

A fourth aspect of the present disclosure provides the permanent magnet synchronous machine according to the second aspect, in which the rotor further includes a rotor end plate that is disk-shaped and made of a nonmagnetic material, and the rotor end plate has a hole that holds the first permanent magnets and the second permanent magnets.

A fifth aspect of the present disclosure provides the permanent magnet synchronous machine according to any one of the second to fourth aspects, in which the rotor yoke includes a first portion that covers the plurality of first permanent magnets and a second portion that expands from the first portion in the radial direction.

A sixth aspect of the present disclosure provides the permanent magnet synchronous machine according to any one of the second to fifth aspects, in which, on each of the pair of end surfaces, the plurality of first permanent magnets include only one of the permanent magnet comprising a north pole facing the N-region of the end surface and the permanent magnet comprising a south pole facing the S-region of the end surface, and the second permanent magnets are disposed on a region across a boundary between the N-region and the S-region, and adjacent to at least one of the plurality of first permanent magnets in the circumferential direction, and in which the rotor yoke magnetically couples the plurality of first permanent magnets to regions of the end surface on which the first permanent magnets are not disposed.

A seventh aspect of the present disclosure provides the permanent magnet synchronous machine according to the sixth aspect, in which some of the plurality of first permanent magnets disposed on one of the pair of end surfaces comprise north poles facing the one of the end surfaces, and in which some of the plurality of first permanent magnets disposed on the other of the pair of end surfaces comprise south poles facing the other of the end surfaces.

An eighth aspect of the present disclosure provides the permanent magnet synchronous machine according to any one of the first to seventh aspects, in which the overhang of the rotor further includes a plurality of third permanent magnets disposed on a region of each end surface, the plurality of third permanent magnets being located in the radial direction from the plurality of first permanent magnets, and in which the third permanent magnets are provided in the configuration which causes the third permanent magnets to generate a magnetic flux in the radial direction.

A ninth aspect of the present disclosure provides the permanent magnet synchronous machine according to any one of the first to eighth aspects, in which the second permanent magnets are disposed on a portion of each end surface between the N-region and the S-region, and in which north poles of the second permanent magnets faces the N-region of the end surface and south poles of the second permanent magnets faces the S-region of the end surface.

A tenth aspect of the present disclosure provides the permanent magnet synchronous machine according to any one of the first to ninth aspects, in which the plurality of first permanent magnets are disposed on the N-region or the S-region of each end surface of the core body.

An eleventh aspect of the present disclosure provides the permanent magnet synchronous machine according to the third or fourth aspect, in which the rotor end plate functions as a balance weight.

A twelfth aspect of the present disclosure provides the permanent magnet synchronous machine according to any one of the first to eleventh aspects, in which the core body of the rotor includes a plurality of ferrite magnets that form the plurality of magnetic poles, and in which the plurality of first permanent magnets and the plurality of second permanent magnets are samarium-cobalt magnets.

Figure 1A:
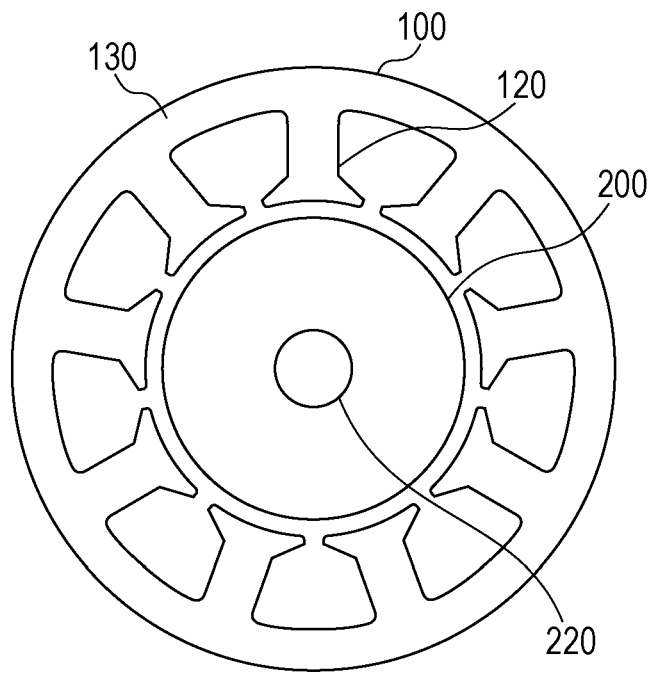
FIG. 1A is a cross-sectional view illustrating an example of the basic structure of a permanent magnet synchronous machine according to the present disclosure.
Figure 1B:
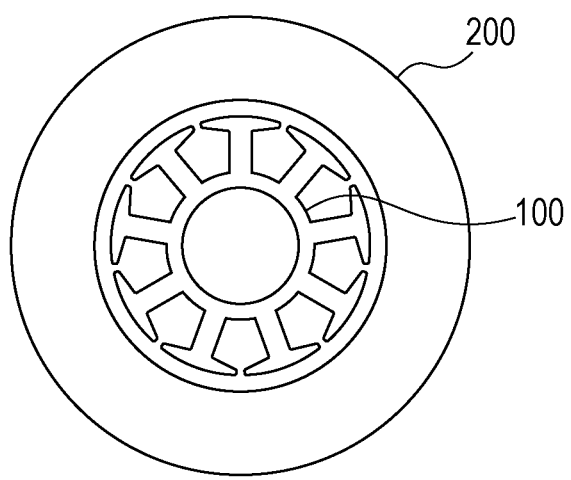
FIG. 1B is a cross-sectional view illustrating another example of the basic structure of a permanent magnet synchronous machine according to the present disclosure.

Next, an overview of the basic structure of a permanent magnet synchronous machine according to the present disclosure will be described. FIG. 1A is a cross-sectional view illustrating an example of the basic structure of a permanent magnet synchronous machine according to the present disclosure. The permanent magnet synchronous machine illustrated in FIG. 1A includes a stator 100 and a rotor 200. The rotor 200 has magnetic poles, each facing the stator 100 with an air gap therebetween. The magnetic poles generate magnetic fluxes in the radial direction with respect to a rotation shaft 220 of the rotor 200 (in a direction away from the rotation shaft 220 or in a direction toward the rotation shaft 220). The rotor 200 may be disposed inside of the stator 100 as illustrated FIG. 1A or may be disposed outside of the stator 100 as illustrated in FIG. 1B. Hereinafter, embodiments of a permanent magnet synchronous machine according to the present disclosure having the structure illustrated in FIG. 1A will be described. However, at the end of the description, another embodiment having the structure illustrated in FIG. 1B will be described.

As illustrated in FIG. 1A, the stator 100 includes a stator core 130 including teeth 120 and coils (not shown) each wound around a corresponding one of the teeth 120. The stator 100 may have a structure the same as that of known permanent magnet synchronous machines.

Figure 2:
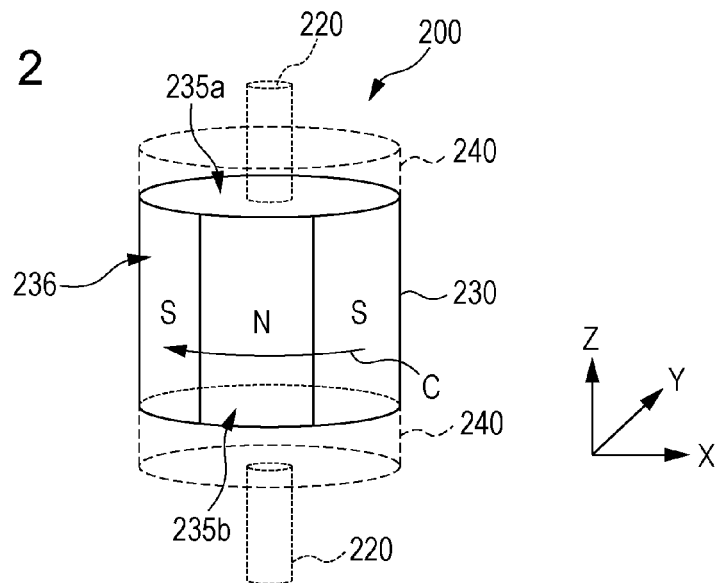
FIG. 2 is a perspective view illustrating an example of the structure of a rotor.

As illustrated in FIG. 2, the rotor 200 includes a core body (rotor core body) 230 having a pair of end surfaces 235a and 235b and a surface 236. The end surfaces 235a and 235b are perpendicular to the rotation shaft 220. On the surface 236, north poles and south poles, which are included in the magnetic poles, are alternately arranged in the circumferential direction (the direction of arrow C). If the stator 100 is disposed outside of the rotor 200, the magnetic poles (the north poles and the south poles) are arranged on the outer peripheral surface of the core body 230 of the rotor 200. If the rotor 200 is disposed outside of the stator 100, the magnetic poles (the north poles and the south poles) are arranged on the inner peripheral surface of the core body 230 of the rotor 200. In FIG. 2, an XYZ coordinate system, which has a Z-axis extending parallel to the rotation axis, is shown. In the present disclosure, the direction parallel to the rotation axis may be simply referred to as the "axial direction". In the present disclosure, the term "axial sectional view" refers to a view illustrating a cross section including the rotation axis (Z-axis), and the term "plan view" refers to a view illustrating a surface parallel to the XY plane seen in the Z-axis direction.

Figure 3:
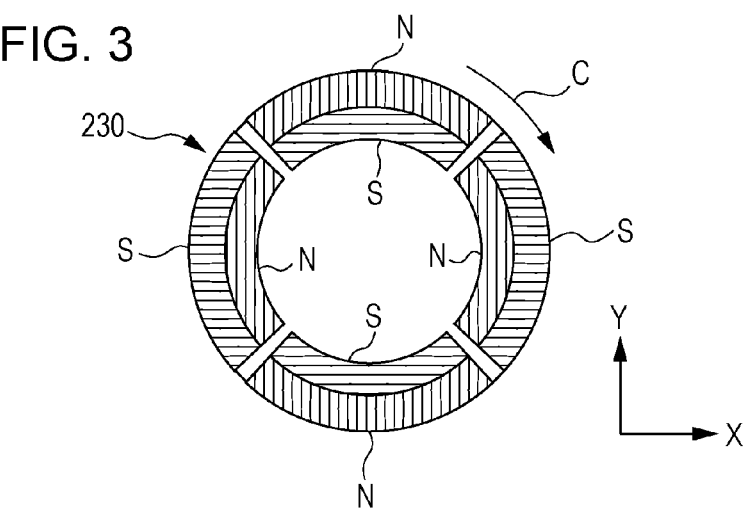
FIG. 3 is a schematic cross-sectional view illustrating an example of arrangement of magnetic poles in a core body of the rotor.

FIG. 3 is a schematic cross-sectional view illustrating an example of arrangement of magnetic poles (four poles) in the core body 230 of the rotor 200. This cross-sectional view illustrates a cross section taken along a plane perpendicular to the axial direction (parallel to the XY-plane). In the example illustrated in FIG. 3, four magnetic poles, including a north pole, a south pole, a north pole, and a south pole, are arranged in the circumferential direction indicated by an arrow C. The north poles on the outer periphery of the core body 230 generate magnetic fluxes extending outward in the radial direction, and the south poles on the outer periphery of the core body 230 generate magnetic fluxes extending inward in the radial direction. The number of magnetic poles of the rotor 200 is not limited to four, and may be two, six, or more than six. Typically, magnetic poles are formed by permanent magnets disposed inside the core body 230 or on a surface of the core body 230. However, magnetic poles may be formed on a surface of the core body 230 by magnetic fluxes generated by permanent magnets disposed in an overhang (described below).

Figure 4:
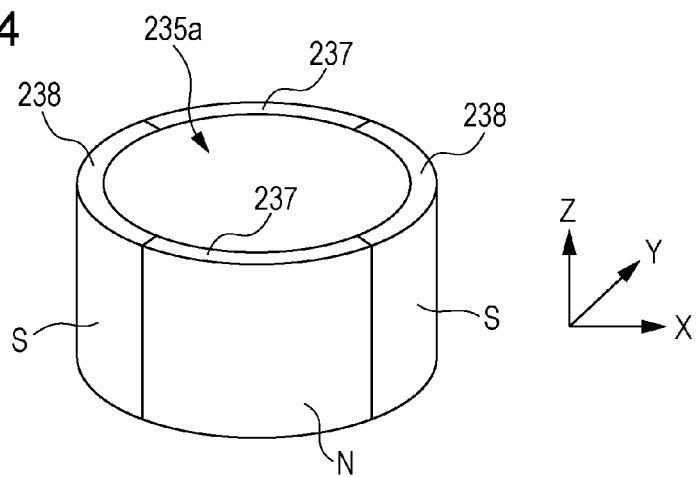
FIG. 4 is perspective view illustrating an end surface of the core body of the rotor.

As illustrated in FIG. 4, the end surfaces 235a and 235b of the core body 230 of the rotor 200 each include N-regions 237 and S-regions 238. The N-regions are adjacent to the north poles included in the magnetic poles, and the S-regions 238 are adjacent to the south poles included in the magnetic poles. In the example illustrated in FIG. 4, the number of the N-regions 237 and the number of the S-regions 238 are each two, which corresponds to the four-pole structure illustrated in FIG. 3. The number of the N-regions 237 and the number of the S-regions 238 each may be changed depending on the number of magnetic poles of the core body 230 of the rotor 200. In the example illustrated in FIG. 4, each of the N-regions 237 is in close contact with an adjacent one of the S-regions 238. However, intermediate regions may exist between the N-regions 237 and the S-regions 238.

Referring back to FIG. 2, the rotor 200 according to the present disclosure includes overhangs 240 on the end surfaces 235a and 235b of the core body 230. As described below in detail, the overhangs 240 protrude further in the direction parallel to the rotation shaft 220 than the stator core 130 of the stator 100.

Each of the overhangs 240 includes first permanent magnets (not shown in FIG. 4) and second permanent magnets (not shown in FIG. 4), which are disposed on a corresponding one of the end surfaces 235a and 235b of the core body 230. The first permanent magnets are arranged along the outer edge of each of the end surfaces 235a and 235b with distances therebetween. The second permanent magnets are disposed adjacent to the first permanent magnets. The first permanent magnets on the end surface 235a include at least one of a set of permanent magnets having north poles facing the N-regions 237 of the end surface 235a and a set of permanent magnets having south poles facing the S-regions 238 of the end surface 235a. The second permanent magnets on the end surface 235a are disposed so as to generate magnetic fluxes extending from the S-regions 238 toward the N-regions 237 of the end surface 235a. Likewise, the first permanent magnets on the end surface 235b include at least one of a set of permanent magnets having north poles facing the N-regions 237 of the end surface 235b and a set of permanent magnets having south poles facing the S-regions 238 of the end surface 235b. The second permanent magnets on the end surface 235b are disposed so as to generate magnetic fluxes extending from the S-regions 238 toward the N-regions 237 of the end surface 235b. The structures and functions of the first and second permanent magnets will be described in detail in the descriptions of embodiments below.

Hereinafter, embodiments of the present disclosure will be described in more detail.

First Embodiment

Figure 5A:
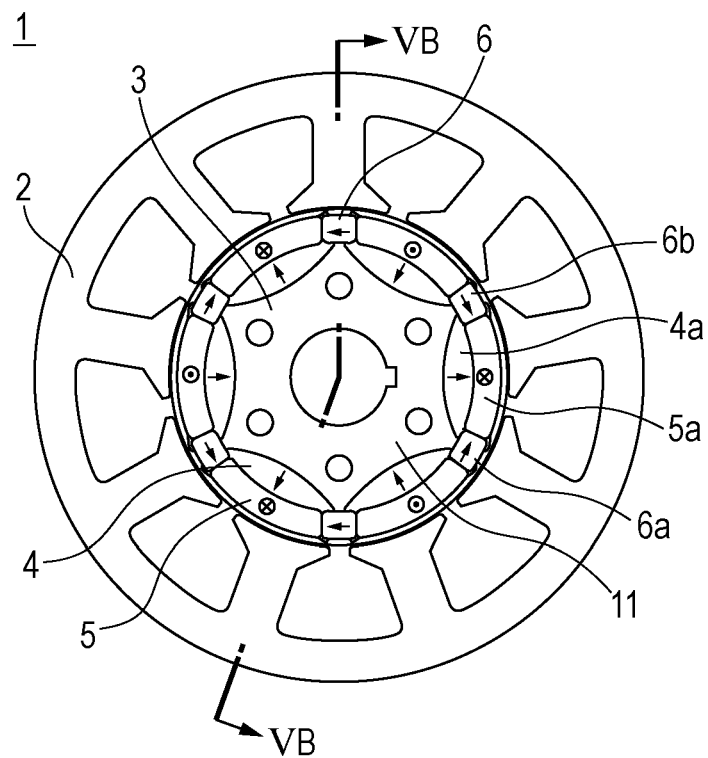
FIGS. 5A and 5B are respectively a plan view and an axial sectional view of a permanent magnet synchronous machine according to a first embodiment of the present disclosure.
Figure 5B:
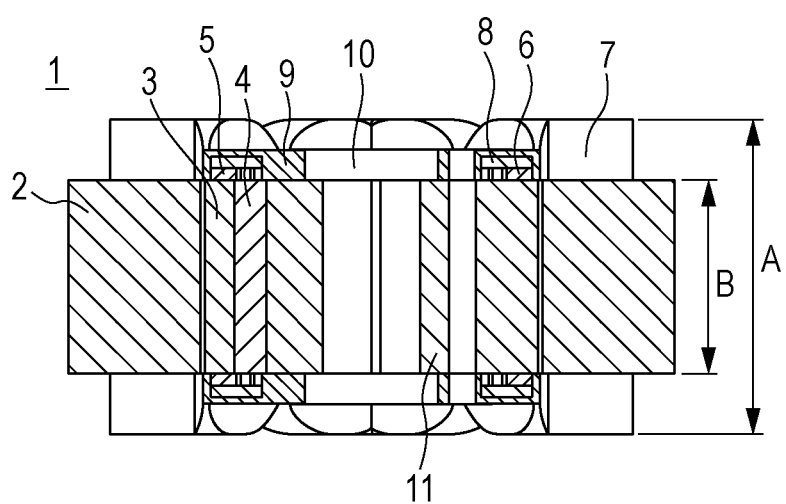

FIG. 5A is a plan view of a permanent magnet synchronous machine 1 according to a first embodiment of the present disclosure. FIG. 5B is an axial sectional view taken along line VB-VB of FIG. 5A. For simplicity, a stator coil, a rotor yoke, and a rotor end plate, which are illustrated in FIG. 5B, are not illustrated in FIG. 5A.

The permanent magnet synchronous machine 1 includes a stator core (stator iron core) 2 including a stator yoke and stator teeth. The stator yoke is annular, and the stator teeth extend from the stator yoke in the radial direction. In stator slots surrounded by the stator yoke and the stator teeth, stator coils 7 (see FIG. 5B) are disposed with insulators (not shown) interposed between the stator teeth and the stator coils 7. For example, the stator core 2 may be made by laminating electrical steel sheets in the axial direction. Each of the stator coils 7 in the stator slots is concentratedly wound around a corresponding one of the stator teeth. As illustrated in FIG. 5B, the stator coils 7 each have portions (coil ends) that protrude from the stator core 2 outward in the axial direction. The structures of the stator core 2 and the stator coils 7 and the methods of manufacturing the stator core 2 and the stator coils 7 are the same as those of other embodiments described below.

In FIG. 5B, the stator has a length A in the axial direction, and the stator core 2 has a length B in the axial direction. The difference between the length A of the stator and the length B of the stator core 2 corresponds to the length of the coil ends in the axial direction. Overhangs 10 of a rotor 11 are disposed in spaces on inner peripheral sides of the coil ends. The rotor 11 includes a rotor core body 3 and six main permanent magnets 4. The rotor core body 3 is made by laminating electrical steel sheets in the axial direction. The main permanent magnets 4 are inserted into permanent magnet insertion holes of the rotor core body 3. Thus, six magnetic poles are formed on the outer peripheral surface of the rotor 11. The main permanent magnets 4 according to the first embodiment may be inverted-arc shaped ferrite magnets. In the example illustrated in FIG. 5B, the length of the rotor core body 3 (in the axial direction) is the same as the length of the stator core 2 (in the axial direction). Alternatively, the length of the rotor core body 3 (in the axial direction) may be larger than or smaller than the length of the stator core 2 (in the axial direction).

The overhangs 10 of the rotor 11 are disposed on end surfaces of the rotor core body 3. The overhangs 10 each include first permanent magnets 5 and second permanent magnets 6. The first permanent magnets 5 generate magnetic fluxes in the axial direction. The second permanent magnets 6 generate magnetic fluxes in directions perpendicular to the rotation axis. In the first embodiment, the first and second permanent magnets 5 and 6 may be samarium-cobalt magnets (Sm—Co magnets), which are rare-earth magnets.

In FIG. 5A and related figures, the direction of a magnetic flux generated by a permanent magnet is indicated by "→", if the direction is perpendicular to the rotation axis. The direction of a magnetic flux extending out of the plane of FIG. 5A is indicted by ".", and the direction of a magnetic flux extending into the plane of FIG. 5A is indicted by "x". On each region (N-region) of an end surface of the rotor core body 3 adjacent to a region in which a main permanent magnet 4a forms a north pole on the outer peripheral surface of the rotor 11, a first permanent magnet 5a is disposed so as to generate a magnetic flux extending from the end surface of the rotor core body 3 into the rotor core body 3. The north poles and the south poles of second permanent magnets 6a and 6b, which are disposed adjacent to the first permanent magnet 5a, face in the circumferential direction (tangential direction), so that the second permanent magnets 6a and 6b generate magnetic fluxes toward the first permanent magnets 5a. In the present disclosure, the first permanent magnets 5 and the second permanent magnets 6 may be collectively referred to as "sub-permanent magnets".

The overhangs 10 of the rotor core body 3 each include a rotor yoke 8, which is annular and covers the sub-permanent magnets 5 and 6. The rotor yoke 8 may be made of a magnetic material (for example, pure iron SUY-1 or carbon steel S45C). Accordingly, the rotor yoke 8 is magnetically coupled to the sub-permanent magnets 5 (first permanent magnets 5). In the first embodiment, a rotor end plate 9 covers the rotor yoke 8 and the sub-permanent magnets 5 and 6. The rotor end plate 9 is cup-shaped and made of a nonmagnetic material (for example, austenitic stainless steel SUS304). The rotor end plate 9 may be fastened to the rotor core body 3 with, for example, rivets or bolts.

Figure 6:
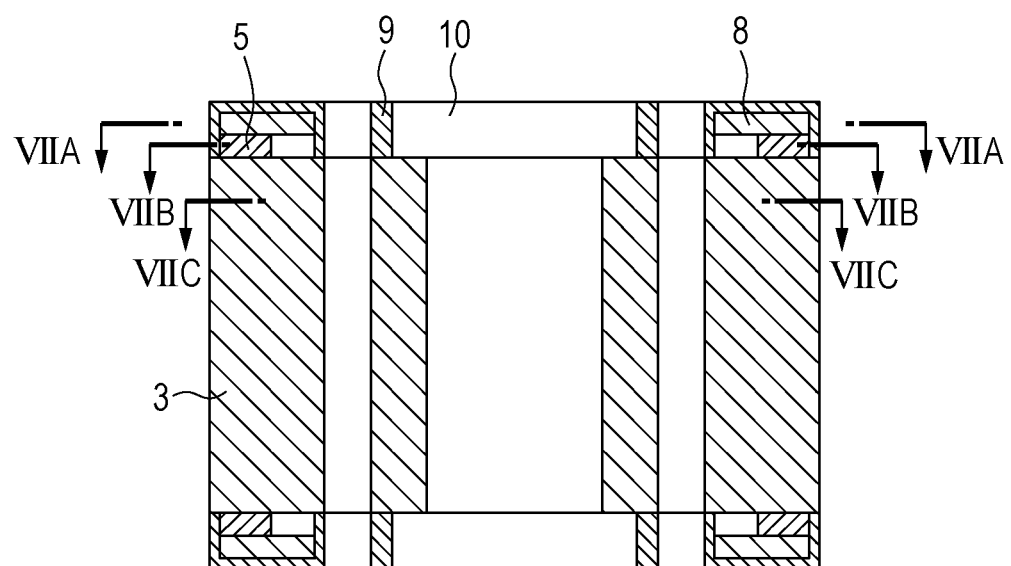
FIG. 6 is an axial sectional view of a rotor of the permanent magnet synchronous machine according to the first embodiment of the present disclosure.
Figure 7A:
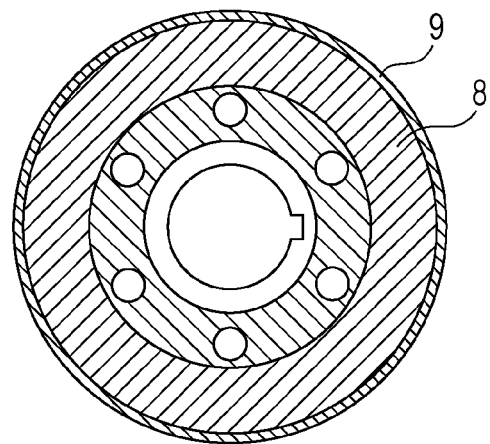
FIGS. 7A to 7C are cross-sectional views of the rotor of the permanent magnet synchronous machine according to the first embodiment of the present disclosure.
Figure 7B:
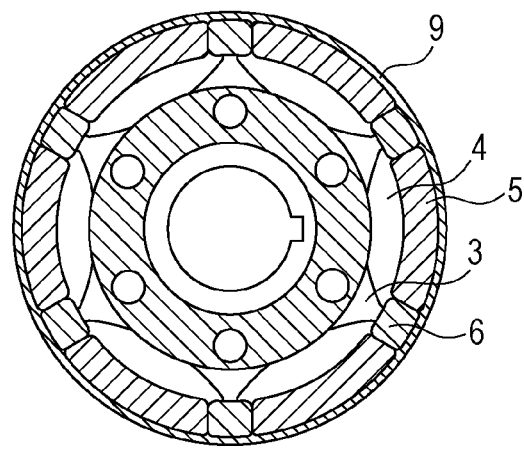
Figure 7C:
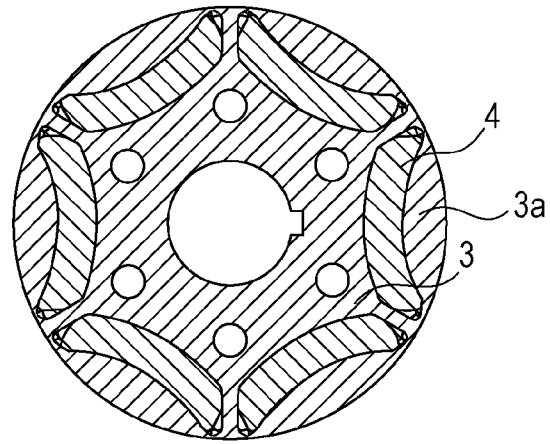

FIG. 6 is an axial sectional view of the rotor 11 of the permanent magnet synchronous machine according to the first embodiment of the present disclosure. FIGS. 7A to 7C are cross-sectional views of the rotor 11 of the permanent magnet synchronous machine according to the first embodiment of the present disclosure. FIG. 7A illustrates a cross section taken along line VIIA-VIIA FIG. 6, FIG. 7B illustrates a cross section taken along line VIIB-VIIB of FIG. 6, and FIG. 7C illustrates a cross section taken along line VIIC-VIIC of FIG. 6.

As illustrated in FIG. 7C, in the first embodiment, six main permanent magnets 4, each being inverted-arc shaped, are disposed in the rotor core body 3. As illustrated in FIG. 7C, outer peripheries 3a, which serve as magnetic poles of the rotor core body 3, are disposed outside of the main permanent magnets 4.

FIG. 7B illustrates a cross section of the overhang 10 of the rotor 11 passing through the sub-permanent magnets 5 and 6. The first permanent magnets 5 are disposed on end surfaces (N-regions or S-regions) of the outer peripheries 3a of the rotor core body 3 illustrated in FIG. 7C. The second permanent magnets 6 are disposed between adjacent first permanent magnets 5 (between poles). The rotor end plate 9, which is cup-shaped, covers the first permanent magnets 5 and the second permanent magnets 6.

FIG. 7A is a cross-sectional view of the overhang 10 of the rotor 11 including the rotor yoke 8. The rotor yoke 8, which is annular, covers the first permanent magnets 5 and the second permanent magnets 6 illustrated in FIG. 7B. The rotor end plate 9, which is cup-shaped, covers the outer periphery of the rotor yoke 8. As can be seen from FIGS. 6, 7A, and 7B, the rotor yoke 8 includes a first portion and a second portion. The first portion covers the permanent magnets 5 and the second permanent magnets 6. The second portion extends from the first portion inward in the radial direction.

Figure 8A:
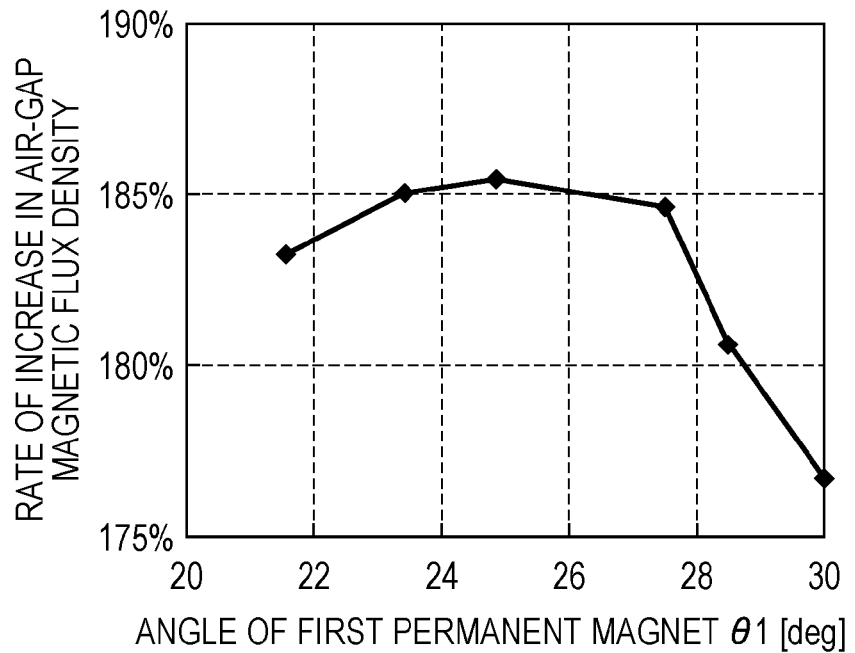
FIG. 8A is a graph representing the rate of increase in the air-gap magnetic flux density due to sub-permanent magnets according to the first embodiment of the present disclosure.
Figure 8B:
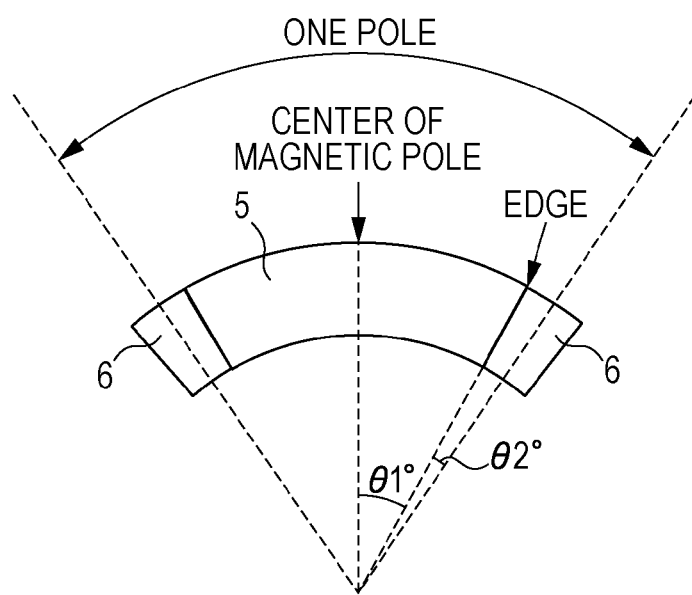
FIG. 8B is a partial plan view illustrating the layout of sub-permanent magnets according to the first embodiment of the present disclosure.

FIG. 8A is a graph representing the rate of increase in the air-gap magnetic flux density due to the sub-permanent magnets 5 and 6 according to the first embodiment of the present disclosure. The horizontal axis represents the angle θ1 of an arc between the center of a magnetic pole and an end (edge) of the first permanent magnet 5. Referring to FIG. 8B, this will be described in detail. FIG. 8B is a plan view illustrating one first permanent magnet 5 corresponding to one magnetic pole and two second permanent magnets 6 disposed at ends of first permanent magnet 5. An angle θ2 is half the angle of an arc connecting both ends of one of the second permanent magnets 6. In the first embodiment, the angle for one pole is 60 degrees, because the rotor has six magnetic poles. Accordingly, in this example, the sum of θ1 and θ2 is equal to 30 degrees, which is one half of 60 degrees.

As can be seen from FIG. 8B, for example, if the angle θ1 of the first permanent magnet 5 is 25 degrees, an angle (θ1×2) corresponding to an arc between one end and the other end of the first permanent magnet 5 forming one pole is 50 degrees. In this case, the second permanent magnets 6, each corresponding to an arc having an angle of 10 degrees, are disposed on both sides of the first permanent magnet 5, and the second permanent magnets have portions that are adjacent to the first permanent magnet 5 and each correspond to an arc having an angle of 5 degrees. These portions are also included in one pole. If the angle θ1 of the first permanent magnet 5 is 30 degrees, the first permanent magnet 5 covers an area corresponding to the arc of one magnetic pole.

The rate of increase in the air-gap magnetic flux density is the ratio (%) of an increase in the magnetic flux density at the center of the air gap due to addition of the sub-permanent magnets 5 and 6 from the magnetic flux density at the center of the air gap when the sub-permanent magnets 5 and 6 are not present.

In the structure of the first embodiment, when the angle of the first permanent magnet 5 is 25 degrees (when the first permanent magnet in one pole has 50 degrees and the second permanent magnets in one pole each has 5 degrees), the rate of increase in the magnetic flux density at the center of the air gap due to the sub-permanent magnets 5 and 6 is 186%. The term "the center of the air gap" refers to an imaginary cylindrical surface at the center of the air gap between the stator 100 and the rotor 200. When the angle of the first permanent magnet 5 is 30 degrees (when the second permanent magnets 6 are not present), the rate of increase in the magnetic flux density at the center of the air gap is 177%. This shows that it is possible to increase the magnetic flux density at the center of the air gap per a unit amount of permanent magnet by providing, as sub-permanent magnets disposed on the end surface of the rotor core body 3, the second permanent magnets 6, which form magnetic fluxes in directions perpendicular to the rotation axis, in addition to the first permanent magnets 5, which form magnetic fluxes in the axial direction. As a result, it is possible to increase effective magnetic flux. As can be seen from FIG. 8A, the proportion of the second permanent magnet 6 in the sub-permanent magnets 5 and 6 may be set to be larger than 0% and smaller than or equal to about 20%.

In the first embodiment, as illustrated in FIG. 5B, which is an axial sectional view, the amount of overhangs (the length of the overhangs in the axial direction) of the rotor 11 may be set to be smaller than or equal to 50% of the length of the coil ends in the axial direction (A–B) (for example, about 4 to 6 mm). Even in such a case, it is possible to obtain the effect shown in FIG. 8A.

Accordingly, the structure according to the first embodiment is effective in a case where the overhang 10 of the rotor 11 is not allowed to have a sufficient length in the axial direction. For example, even if a stator having concentrated-winding coils and having a small length in the axial direction is used or even if the distance between the rotor and a bearing (not shown) is not sufficient, according to the first embodiment, it is possible to provide a lightweight, low-inertia, and high-power permanent magnet synchronous machine.

In the first embodiment, if ferrite magnets are used as the main permanent magnets 4 and samarium-cobalt magnets are used as the sub-permanent magnets 5 and 6, it is possible to provide a permanent magnet synchronous machine having high heat resistance at a cost lower than that of a synchronous machine in which neodymium magnets are used. The coercive force of a neodymium magnet is 2000 kA/m, and the temperature coefficient of the coercive force is –0.55%/° C. The coercive force of a samarium-cobalt magnet is 2300 kA/m, and the temperature coefficient of the coercive force is –0.15%/° C. The coercive force of a ferrite magnet is 380 kA/m, and the temperature coefficient of the coercive force is +0.2%/° C. For example, if the temperature increases by 150° C., the coercive force of a neodymium magnet decreases to 350 kA/m, while the coercive force of a samarium-cobalt magnet becomes 1780 kA/m and the coercive force of a ferrite magnet becomes 490 kA/m. By using samarium-cobalt magnets and ferrite magnets, it is possible to maintain a larger coercive force and to obtain a higher heat resistance than by using neodymium magnets.

In the first embodiment, the coils of the stator are concentrated-winding coils. However, the coil of the stator may be distributed-winding coils. The permanent magnets 4, 5, and 6 are not limited to a combination of ferrite magnets and Sm—Co magnets. The rotor end plate of the overhang 10 of the rotor 11 may be configured to function as a balance weight. In this case, it is possible to realize a more stable operation. These modifications can be also made to other embodiments.

Second Embodiment

Figure 9A:
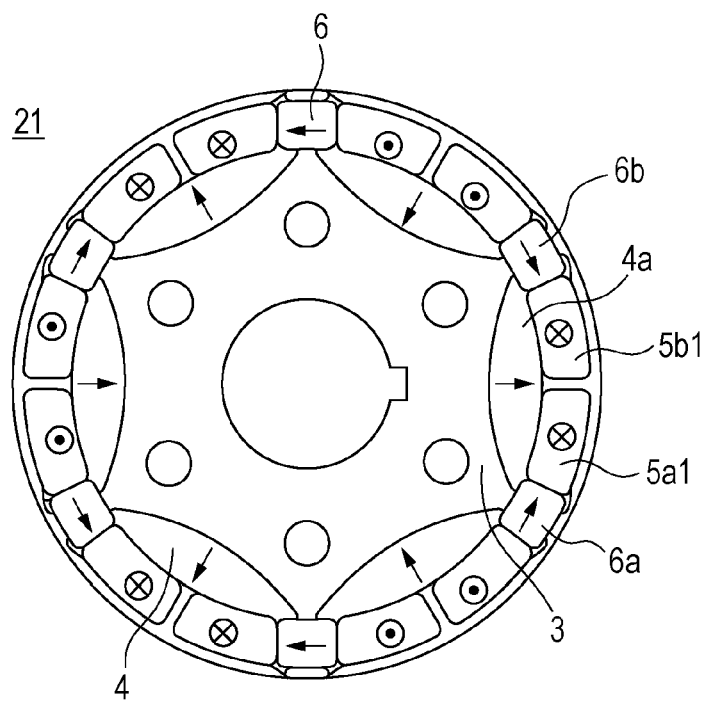
FIGS. 9A and 9B are respectively a plan view and an axial sectional view of a rotor of a permanent magnet synchronous machine according to a second embodiment of the present disclosure.
Figure 9B:
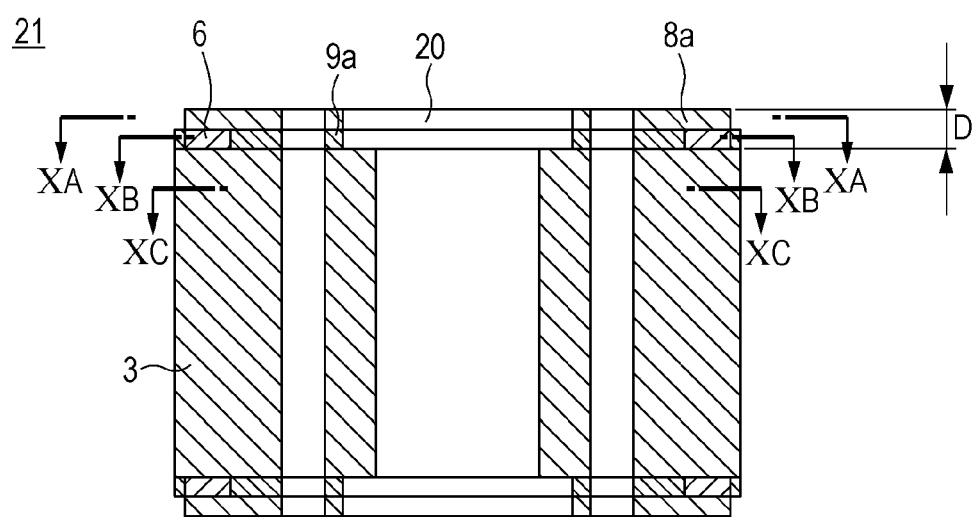

Next, referring to FIGS. 9A and 9B, the structure of a rotor according to a second embodiment of the present disclosure will be described. The second embodiment differs from the first embodiment in that each of first permanent magnets disposed in an overhang of the rotor is divided into two portions and in a structure that fixes sub-permanent magnets to end surfaces of a rotor core body. FIGS. 9A and 9B are respectively a plan view and an axial sectional view of a rotor 21 of a permanent magnet synchronous machine according to the second embodiment of the present disclosure. In order to illustrate the arrangement of permanent magnets, a rotor yoke and a rotor end plate are omitted from FIG. 9A.

Also in the second embodiment, as in the first embodiment, ferrite magnets, each being inverted-arc shaped, are used as the main permanent magnets 4. In the second embodiment, overhangs 20 of the rotor 21 each include first permanent magnets 5a1 and 5b1 and second permanent magnets 6. The first permanent magnets 5a1 and 5b1 generate magnetic fluxes in the axial direction. The second permanent magnets 6 generate magnetic fluxes in directions perpendicular to the rotation axis. In the second embodiment, the first and second permanent magnets are Sm—Co magnets.

In FIG. 9A, the directions of magnetic fluxes generated by the permanent magnets are indicated by the aforementioned symbols. On each region of an end surface of a rotor core body 3 of the rotor 21 adjacent to a region in which a main permanent magnet 4a forms a north pole on the outer peripheral surface of the rotor core body 3, the north poles of the first permanent magnets 5a1 and 5b1 are disposed behind the plane of FIG. 9A so that the first permanent magnets 5a1 and 5b1 generate magnetic fluxes extending from the end surface of the rotor core body 3 into the rotor core body 3. The north pole of a second permanent magnet 6a adjacent to the first permanent magnet 5a1 and the north pole of a second permanent magnet 6b adjacent to the first permanent magnet 5b1 are disposed so that the second permanent magnets 6a and 6b respectively generate magnetic fluxes extending toward the first permanent magnets 5a1 and 5b1.

Also in the second embodiment, the overhangs 20 of the rotor 21 each include a rotor yoke 8a, which is annular, on the sub-permanent magnets 5 and 6. The rotor yoke 8a is made of a magnetic material (for example, pure iron SUY-1 or carbon steel S45C). A rotor end plate 9a, which is disk-shaped and made of a nonmagnetic material (for example, austenitic stainless steel SUS304), holds the sub-permanent magnets 5 and 6. The rotor yoke 8a covers the sub-permanent magnets 5 and 6 and is fastened to the rotor core body 3 in the axial direction with rivets or bolts.

Figure 10A:
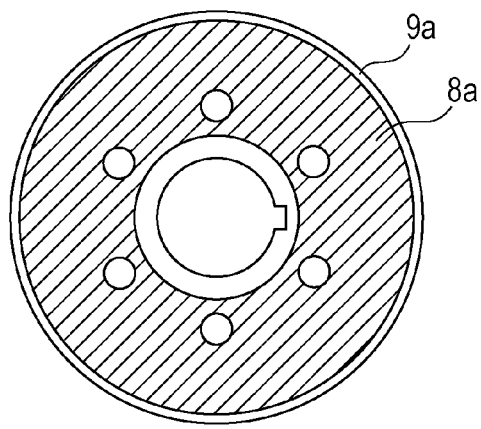
FIGS. 10A to 10C are cross-sectional views of the rotor of the permanent magnet synchronous machine according to the second embodiment of the present disclosure.
Figure 10B:
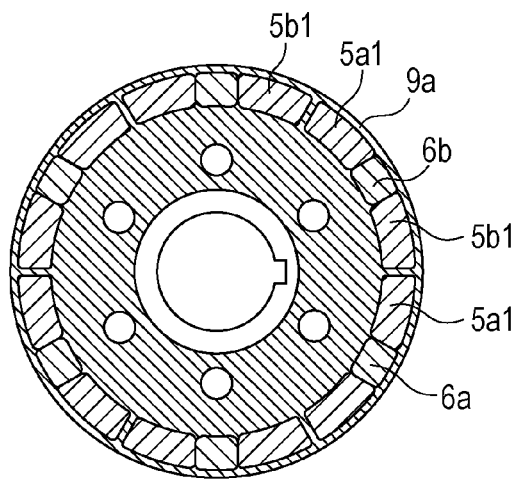
Figure 10C:
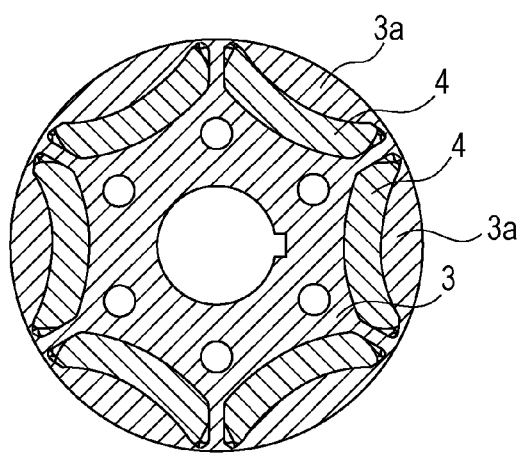

FIGS. 10A to 10C are cross-sectional views of the rotor 21 according to the second embodiment. FIG. 10A illustrates a cross section taken along line XA-XA FIG. 9B, FIG. 10B illustrates a cross section taken along line XB-XB of FIG. 9B, and FIG. 10C illustrates a cross section taken along line XC-XC of FIG. 9B.

As illustrated in FIG. 10C, also in the second embodiment, six main permanent magnets 4, each being inverted-arc shaped, are disposed in the rotor core body 3. FIG. 10B is a cross-sectional view of the overhang 20 of the rotor 21, including the sub-permanent magnets 5a1, 5b1, 6a, and 6b. As illustrated in FIG. 10B, two first permanent magnets 5a1 and 5b1 are disposed on each of regions (N-regions or S-regions) of the end surface of the rotor core body 3 on the outer peripheries 3a illustrated in FIG. 10C. As illustrated in FIG. 10B, the second permanent magnet 6a or the second permanent magnet 6b is disposed at each of boundaries between the outer peripheries 3a on the end surface of the rotor core body 3 (between poles). For example, the second permanent magnet 6b is disposed between one of the first permanent magnets 5a1 that is disposed on a part on the end surface corresponding to a certain magnetic pole and another first permanent magnet 5a1 that is disposed on a part of the end surface corresponding to a magnetic pole adjacent to the certain magnetic pole (between poles).

In the overhang 10 of the first embodiment, one first permanent magnet and two second permanent magnet constitute one pole. In contrast, in the overhang 20 of the second embodiment, two first permanent magnets, which are formed by dividing a first permanent magnet into two portions at the center of a pole, are disposed in the pole.

The rotor end plate 9a not only holds the outer peripheries of the sub-permanent magnets 5a1, 5b1, 6a, and 6b but also holds the sub-permanent magnets 5a1, 5b1, 6a, and 6b by using ribs of the rotor end plate 9a. The ribs are disposed at the centers of poles of the first permanent magnets 5a1 and 5b1, each of which is divided into two. In other words, the sub-permanent magnets 5a1, 5b1, 6a, and 6b are held in holes formed by the ribs of the rotor end plate 9a. The rotor end plate 9a is made of a nonmagnetic material (for example, austenitic stainless steel SUS304).

FIG. 10A is a cross-sectional view of the overhang 20 of the rotor 21, including the rotor yoke 8a. As can be seen from FIG. 9B, which is an axial sectional view, the length D of the overhang 20 of the rotor 21 in the axial direction is determined by the length of each sub-permanent magnet in the axial direction and the length of the rotor yoke in the axial direction. Accordingly, with the second embodiment, because a rotor end plate that covers the rotor yoke 8a is not present, it is possible to make the length of the rotor yoke 8a in the axial direction be smaller than that of the first embodiment by the thickness of the rotor end plate.

With the second embodiment, even if it is not possible to provide an overhang having a sufficient size at an end of the rotor core body 3, it is possible to provide a small and high-power permanent magnet synchronous machine while reducing the length of the overhang 20 of the rotor 21 in the axial direction.

Third Embodiment

Referring to FIGS. 11A to 12C, the structure of a rotor according to a third embodiment of the present disclosure will be described. The third embodiment differs from the first embodiment in that the number of first permanent magnets on each end surface of the rotor core body 3 is three. This is a half the number of poles, which is six.

Figure 11A:
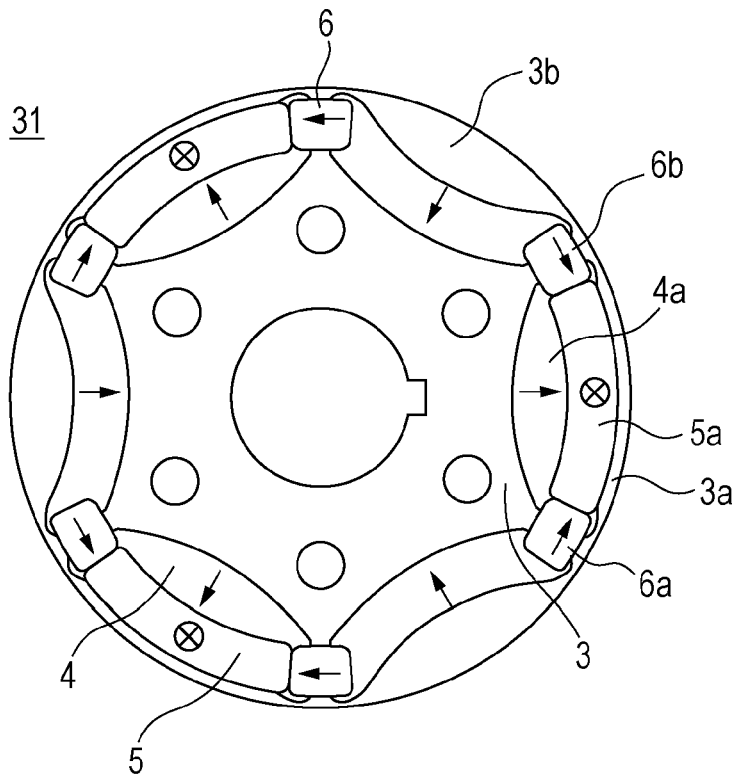
FIGS. 11A and 11B are respectively a plan view and an axial sectional view of a rotor of a permanent magnet synchronous machine according to a third embodiment of the present disclosure.
Figure 11B:
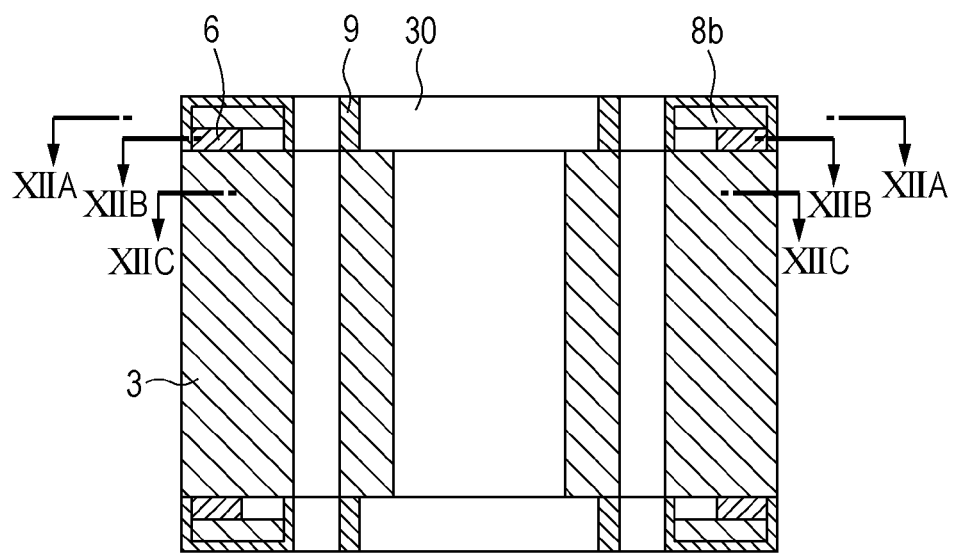

FIG. 11A and FIG. 11B are respectively a plan view and an axial sectional view of a rotor 31. In order to illustrate the arrangement of permanent magnets, a rotor yoke and a rotor end plate are omitted from FIG. 11A. The rotor 31 includes a rotor core body 3 that is the same as that of each of the first end second embodiments. FIG. 11A is a plan view of the rotor 31 seen from above.

Also in the third embodiment, main permanent magnets 4 are inverted-arc-shaped ferrite magnets. Overhangs 30 of the rotor 31 each include first permanent magnets 5 and second permanent magnets 6. The first permanent magnets 5 generate magnetic fluxes in the axial direction. The second permanent magnets 6 generate magnetic fluxes in directions perpendicular to the rotation axis. The first and second permanent magnets 5 and 6 are Sm—Co magnets.

In FIG. 11A, the direction of a magnetic flux of each of the permanent magnets is indicated by an arrow, or by "x" if the direction is into the plane of FIG. 11A. On each region of an end surface of a rotor core body 3 adjacent to a region in which a main permanent magnet 4a forms a north pole on the outer peripheral surface of the rotor core body 3, the north pole of a first permanent magnet 5a is disposed behind the plane of FIG. 11A so that the first permanent magnet 5a generates a magnetic flux extending from the end surface of the rotor core body 3 into the rotor core body 3. The north poles of second permanent magnets 6a and 6b adjacent to the first permanent magnet 5a are disposed so that the second permanent magnets 6a and 6b respectively generate magnetic fluxes extending toward the first permanent magnet 5a.

In the third embodiment, in the overhang 30 on the upper side of the rotor 31, three first permanent magnets 5a are disposed on regions (N-regions) of the end surface of the rotor core body 3 on the north poles of the rotor core body 3. The first permanent magnets 5 are not disposed on regions of the end surface of the rotor core body 3 corresponding to the south poles of the rotor core body 3.

On the other hand, in the overhang 30 on the lower side of the rotor 31, first permanent magnets 5a are disposed so as to face S-regions, which are end surfaces of the rotor core body 3 on the south poles, and the second permanent magnets 6a and 6b are disposed so that the south poles thereof face the first permanent magnets 5a. On the lower end surface of the rotor 31, first permanent magnets 5a are not disposed in the N-regions on the north poles.

Figure 12A:
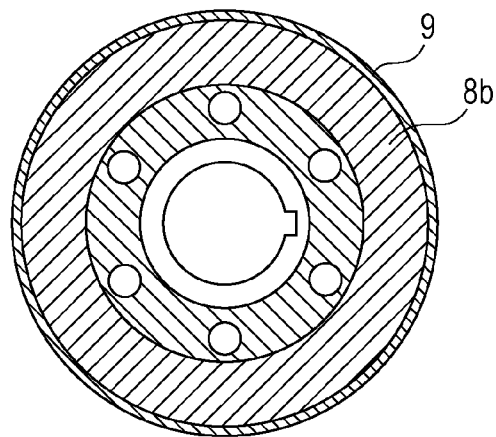
FIGS. 12A to 12C are cross-sectional views of the rotor of the permanent magnet synchronous machine according to the third embodiment of the present disclosure.
Figure 12B:
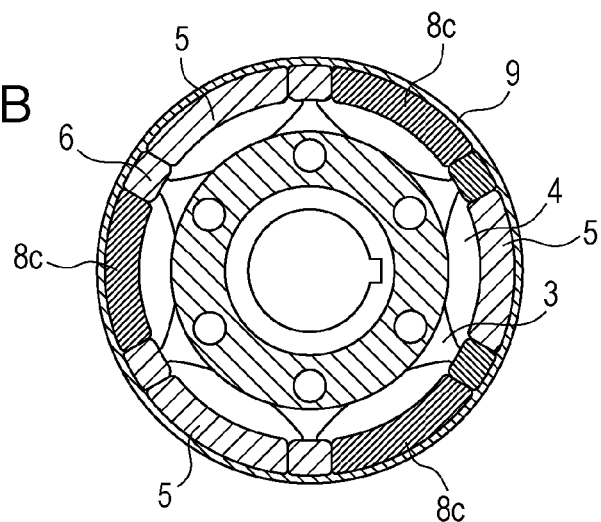
Figure 12C:
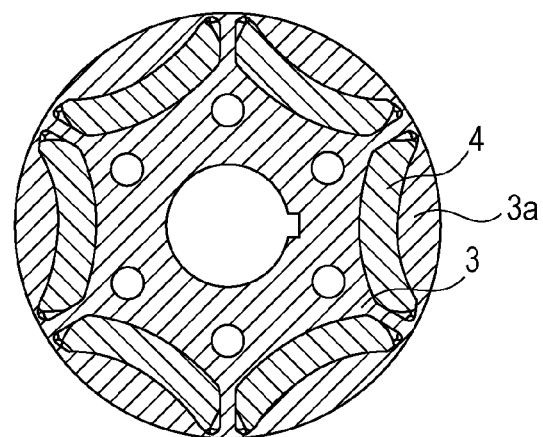

FIGS. 12A to 12C are cross-sectional views of the rotor of the permanent magnet synchronous machine according to the third embodiment of the present disclosure. FIG. 12A illustrates a cross section taken along line XIIA-XIIA of FIG. 11B, FIG. 12B illustrates a cross section taken along line XIIB-XIIB of FIG. 11B, and FIG. 12C illustrates a cross section taken along line XIIC-XIIC of FIG. 11B. As can be seen from FIG. 12C, six main permanent magnets 4, each being inverted-arc shaped, are disposed in the rotor core body 3.

FIG. 12B is a cross-sectional view of the overhang 30 of the rotor 31, including the sub-permanent magnets 5 and 6. The north poles of the first permanent magnets 5 are disposed on end surfaces (N-regions) of the outer peripheries 3a corresponding to the north poles of the main permanent magnets 4 illustrated in FIG. 12C. The north poles of the second permanent magnets 6 are disposed adjacent to the first permanent magnets 5 so as to face the first permanent magnets 5.

A rotor yoke 8b, which is disk-shaped, has three salient poles 8c. The salient poles 8c of the rotor yoke 8b are disposed on end surfaces of the outer peripheries 3b, on which the first permanent magnets are not disposed. The south poles of the first permanent magnets are magnetically coupled to the rotor yoke 8b, which is disk-shaped. The salient poles 8c of the rotor yoke 8b are magnetically coupled to end surfaces (S-regions) of the outer peripheries 3b corresponding to the south poles of the rotor core body 3. The south poles are imaginary poles.

FIG. 12A is a cross-sectional view illustrating the overhang 30 of the rotor 31, including the rotor yoke 8b. The rotor yoke 8b has a disk-shaped cross section. The rotor yoke 8b is made of a magnetic material (for example, pure iron SUY-1 or carbon steel S45C). A rotor end plate 9, which is cup-shaped and made of a nonmagnetic material (for example, austenitic stainless steel SUS304), holds the sub-permanent magnets 5 and 6. The rotor yoke 8b covers the end surface of the rotor 31 and is fastened in the axial direction by using rivets or bolts. The rotor end plate 9 has a groove that holds the sub-permanent magnets 5 and 6 and the rotor yoke 8b.

The third embodiment is advantageous for cost reduction, because it is possible to reduce the number of the first permanent magnets 5 by half. In the third embodiment, the rotor 31 has six poles, and the number of first permanent magnets 5 disposed in the overhang 30 is three, which is half the number of poles of the rotor 31. However, this is not a limitation on the present disclosure. The number of the first permanent magnets 5 in the overhang 30 may be any number smaller than that of poles of the rotor core body 3. If a magnetic flux of the north pole of the first permanent magnet 5 is disposed so that a magnetic flux of a north pole is disposed at a magnetic pole of the rotor core body 3, a magnetic flux may be disposed at a south pole of the rotor core body 3 from the south pole of the first permanent magnet 5 through the rotor yoke. The rotor yoke 8 need not be an integrated body but may be a segmented body, as long as the north pole and the south pole of the sub-permanent magnet can be coupled to the magnetic poles of the rotor core body 3 through the rotor yoke 8.

Fourth Embodiment

Referring to FIGS. 13A to 15C, the structure of a rotor according to a fourth embodiment of the present disclosure will be described. The fourth embodiment differs from the second embodiment in that the number of first permanent magnets on each end surface of the rotor core body 3 is reduced to six from twelve.

Figure 13A:
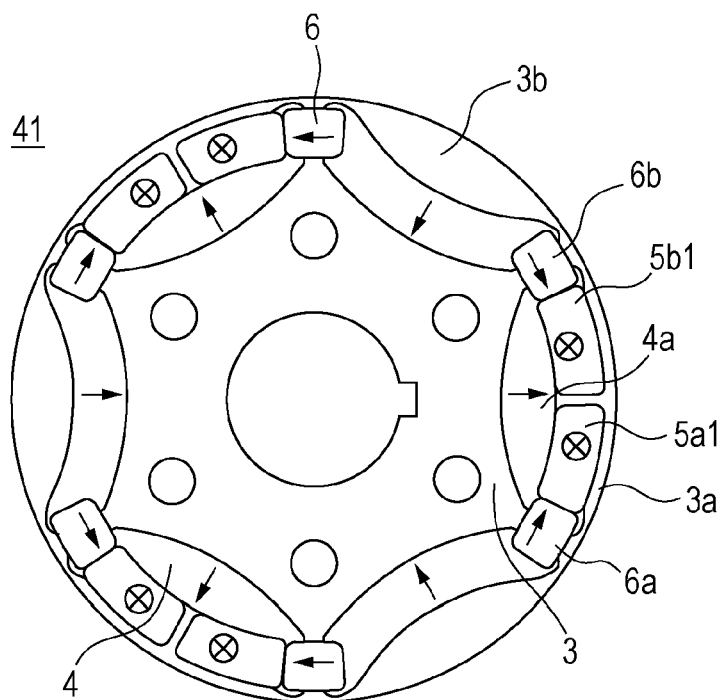
FIGS. 13A and 13B are respectively a plan view and an axial sectional view of a rotor of a permanent magnet synchronous machine according to a fourth embodiment of the present disclosure.
Figure 13B:
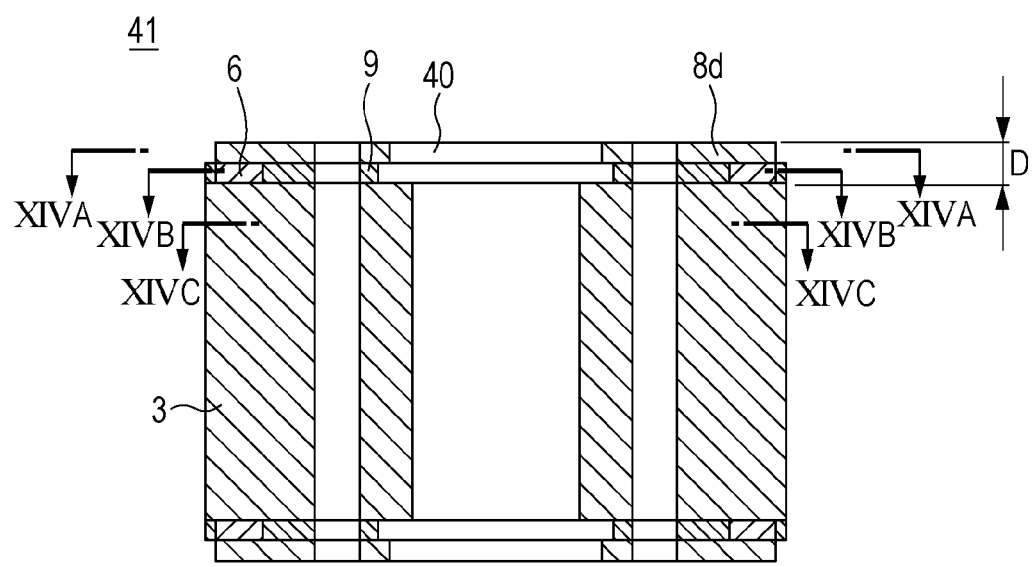

FIGS. 13A and 13B are respectively a plan view and an axial sectional view of a rotor 41. In order to illustrate the arrangement of permanent magnets, a rotor yoke and a rotor end plate are omitted from FIG. 13A. The rotor 41 includes a rotor core body 3 that is the same as that of each of the first to third embodiments.

Also in the fourth embodiment, main permanent magnets 4 are inverted-arc shaped ferrite magnets. Overhangs 40 of the rotor 41 each include first permanent magnets 5 and second permanent magnets 6. The first permanent magnets 5 generate magnetic fluxes in the axial direction. The second permanent magnets 6 generate magnetic fluxes in directions perpendicular to the rotation axis. The first and second permanent magnets 5 and 6 are Sm—Co magnets, which are rare-earth magnets.

In FIG. 13A, the direction of a magnetic flux of each of the permanent magnets is indicated by an arrow, or by "x" if the direction is into the plane of FIG. 13A. On each region of an end surface of a rotor core body 3 adjacent to a region in which a main permanent magnet 4a forms a north pole on the outer peripheral surface of the rotor, the north poles of first permanent magnets 5a1 and 5b1 are disposed behind the plane of FIG. 13A so that the first permanent magnets 5a1 and 5b1 generate magnetic fluxes extending from the end surface of the rotor core body 3 into the rotor core body 3.

The north pole of a second permanent magnets 6a, which is disposed adjacent to the first permanent magnet 5a1, and the north pole of a second permanent magnet 6b, which is disposed adjacent to the first permanent magnet 5b1, are disposed so that the second permanent magnets 6a and 6b generate magnetic fluxes respectively toward the first permanent magnets 5a1 and 5b1.

In the fourth embodiment, in the overhang 40, three pairs of first permanent magnets 5a1 and 5b1 are disposed on end surfaces (N-regions) of the outer peripheries 3a of the rotor core body 3 corresponding to the north poles of the rotor. The first permanent magnets are not disposed on regions of the end surface of the rotor core body 3 corresponding to the south poles of the rotor.

The south poles of the first permanent magnets 5a1 and 5b1 are magnetically coupled to a rotor yoke 8d, which is disk-shaped. The rotor yoke 8d has six salient poles 8e. The salient poles 8e of the rotor yoke 8d, which are connected to the south poles of the first permanent magnets 5a, are magnetically coupled to the outer peripheries 3b of the main permanent magnets 4 in the rotor core body 3 corresponding to the south poles. The rotor yoke 8d is made of a magnetic material (for example, pure iron SUY-1 or carbon steel S45C). A rotor end plate 9a, which is cup-shaped and made of a nonmagnetic material (for example, austenitic stainless steel SUS304), holds the sub-permanent magnets 5 and 6. The rotor yoke 8d covers the end surface of the rotor 41 and is fastened in the axial direction by using rivets or bolts.

Figure 14A:
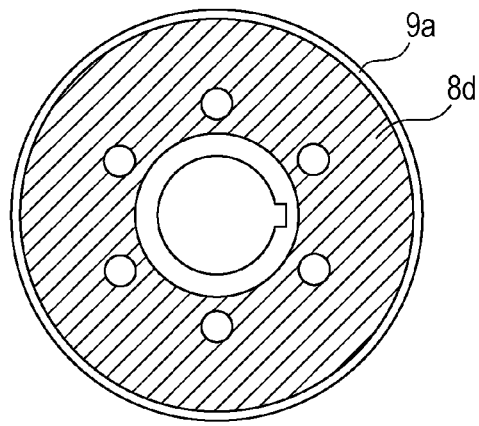
FIGS. 14A to 14C are cross-sectional views of the rotor of the permanent magnet synchronous machine according to the fourth embodiment of the present disclosure.
Figure 14B:
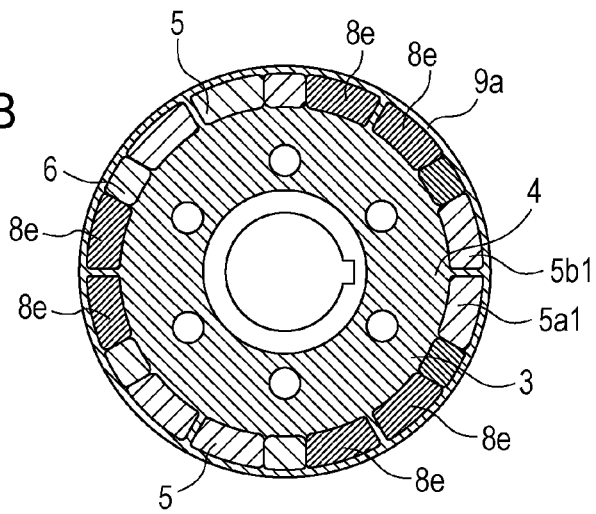
Figure 14C:
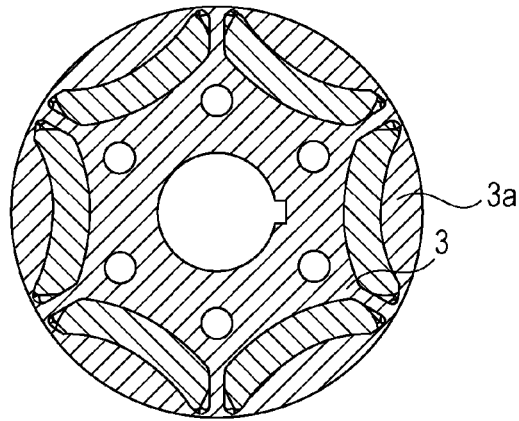

FIGS. 14A to 14C are cross-sectional views of the rotor 41 according to the fourth embodiment. FIG. 14A illustrates a cross section taken along line XIVA-XIVA FIG. 13B, FIG. 14B illustrates a cross section taken along line XIVB-XIVB of FIG. 13B, and FIG. 14C illustrates a cross section taken along line XIVC-XIVC of FIG. 13B.

As illustrated in FIG. 14C, also in the fourth embodiment, six main permanent magnets 4, each being inverted-arc shaped, are disposed in the rotor core body 3. FIG. 14B is a cross-sectional view of the overhang 40 of the rotor 41, including the sub-permanent magnets 5 and 6. In the fourth embodiment, the north poles of first permanent magnets 5a and 5b are disposed on end surfaces (N-regions) of the outer peripheries 3a corresponding to the north poles of the main permanent magnets 4 illustrated in FIG. 14C. The north poles of the second permanent magnets 6a and 6b are disposed adjacent to the first permanent magnets 5a and 5b so as to face the first permanent magnets 5a and 5b.

The rotor yoke 8d, which is disk-shaped, has three salient poles 8e. The salient poles 8e of the rotor yoke 8d are disposed on end surfaces of the outer peripheries 3b, on which the first permanent magnets are not disposed.

The south poles of the first permanent magnets 5 are magnetically coupled to the rotor yoke 8d, which is disk-shaped. The salient poles 8e of the rotor yoke 8d are magnetically coupled to the end surfaces (S-regions) of the outer peripheries 3b corresponding to the south poles of the rotor core body 3. The south poles are imaginary poles.

FIG. 14A is a cross-sectional view illustrating the overhang 40 of the rotor 41, including the rotor yoke 8d. The rotor yoke 8d has a disk-shaped cross section. The rotor yoke 8d is made of a magnetic material (for example, pure iron SUY-1 or carbon steel S45C).

The rotor end plate 9a not only holds the outer peripheries of the sub-permanent magnets but also holds the sub-permanent magnets by using ribs of the rotor end plate 9a. The ribs are disposed at the centers of poles of the first permanent magnets, each of which is divided into two. The rotor end plate 9a is made of a nonmagnetic material (for example, austenitic stainless steel SUS304). The rotor yoke 8d covers the end surface of the rotor and is fastened in the axial direction by using rivets or bolts.

As can be seen from FIG. 13B, which is an axial sectional view, the length D of the overhang 40 of the rotor 41 is determined by the length of each of the sub-permanent magnets 5 and 6 and the length of the rotor yoke 8 in the axial direction. With the fourth embodiment, because a rotor end plate that covers the rotor yoke 8d is not present, it is possible to make the length of the rotor yoke 8a in the axial direction to be smaller than that of the first embodiment by the thickness of the rotor end plate.

Figure 15A:
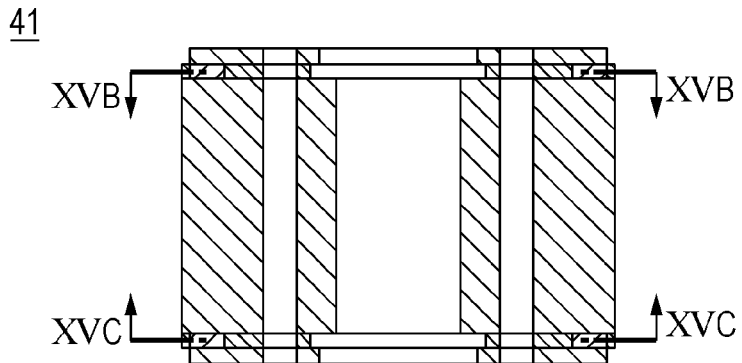
FIG. 15A is an axial sectional view and FIGS. 15B and 15C are cross-sectional views of the rotor of the permanent magnet synchronous machine according to the fourth embodiment of the present disclosure.
Figure 15B:
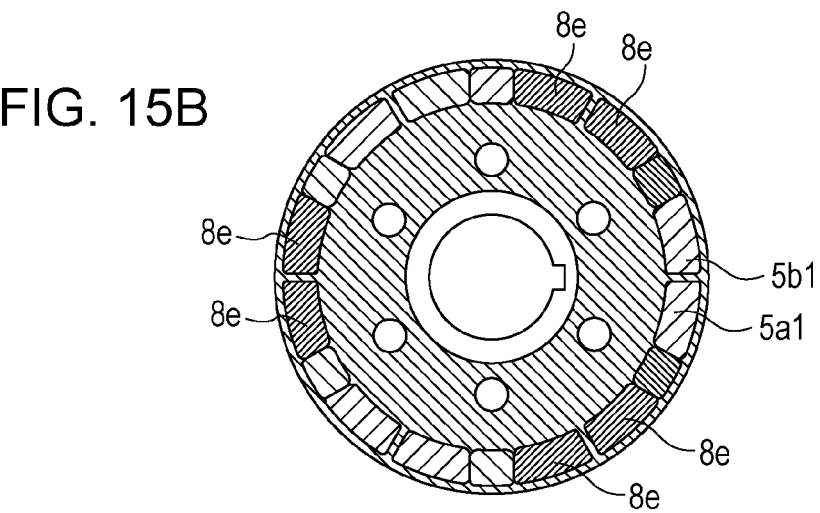
Figure 15C:
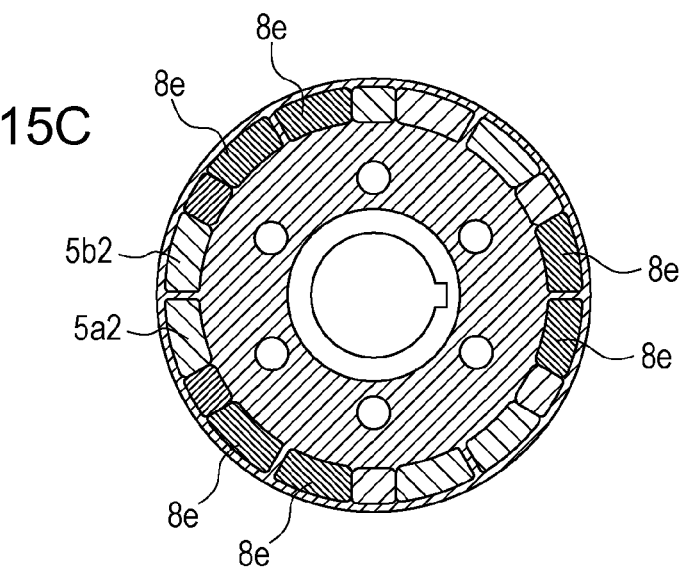

Next, referring to FIGS. 15A to 15C, the relationship between two overhangs at both ends of the rotor 41 will be described. FIG. 15B illustrates a cross section taken along line XVB-XVB of FIG. 15A, and FIG. 15C illustrates a cross section taken along line XVC-XVC of FIG. 15A. FIG. 15B illustrates the arrangement of sub-permanent magnets on the upper side of the rotor 41, and FIG. 15C illustrates the arrangement of sub-permanent magnets on the lower side of the rotor 41. As illustrated in FIG. 15B, it is assumed that a magnetic pole in which a key groove of the rotor 41 is formed (in the three o'clock direction) is a north pole. In this case, on the side illustrated in FIG. 15B, the first permanent magnets 5a1 and 5b1 are disposed so that the north poles of the first permanent magnets 5a1 and 5b1 face the north poles. The first permanent magnets 5a1 and 5b1 are disposed so as to correspond only to the north poles. On the end surface on this side, in regions corresponding to the south poles, the first permanent magnets are not disposed, but the salient poles 8e of the rotor yoke are disposed.

On the side illustrated in FIG. 15C, a magnetic pole located opposite to the key groove of the rotor 41 (in the nine-o'clock direction) is a south pole. The south poles of first permanent magnets 5a2 and 5b2 are disposed so as to face the regions of the end surface corresponding to the south poles. The first permanent magnets 5a2 and 5b2 are disposed so as to correspond only to the south poles. On the end surface on this side, in regions corresponding to the north poles, the first permanent magnets are not disposed, but the salient poles 8e of the rotor yoke are disposed. As a result, in the fourth embodiment, the directions of the first permanent magnets, which are disposed in the overhangs 40 and which form magnetic fluxes in the axial direction, are aligned with each other in the same vertical direction in FIG. 15A.

With the fourth embodiment, in additions to the advantages obtained by the first to third embodiments, it is possible to obtain an advantage of cost reduction by reducing the amount of the first permanent magnets. In the fourth embodiment, the stator coil is a concentrated-winding coil. However, the stator coil may be a distributed-winding coil.

In the fourth embodiment, the rotor has six poles, and the number of sub-permanent magnets disposed in the overhang is three, which is half the number of poles of the rotor. However, the number of sub-permanent magnets in the overhang may be changed to any number smaller than that of poles of the rotor. If a magnetic flux of the north pole of sub-permanent magnet is disposed so that a magnetic flux of a north pole is disposed at a magnetic pole of the rotor, a magnetic flux may be disposed at a south pole of the rotor from the south pole of the sub-permanent magnet through the rotor yoke. The rotor yoke need not be an integrated body but may be a segmented body, as long as the north pole and the south pole of the sub-permanent magnet can be coupled to the magnetic poles of the rotor through the rotor yoke.

As in the third embodiment, as illustrated in FIGS. 15A to 15C, the overhangs at both ends of the rotor may have such a relationship that the first permanent magnets have the north poles and the south poles are imaginary poles on one end surface, the first permanent magnets have the south poles and the north poles are imaginary poles on the other end surface, and the directions of magnetic fluxes of the first permanent magnets in the axial direction are the same.

Fifth Embodiment

Figure 16:
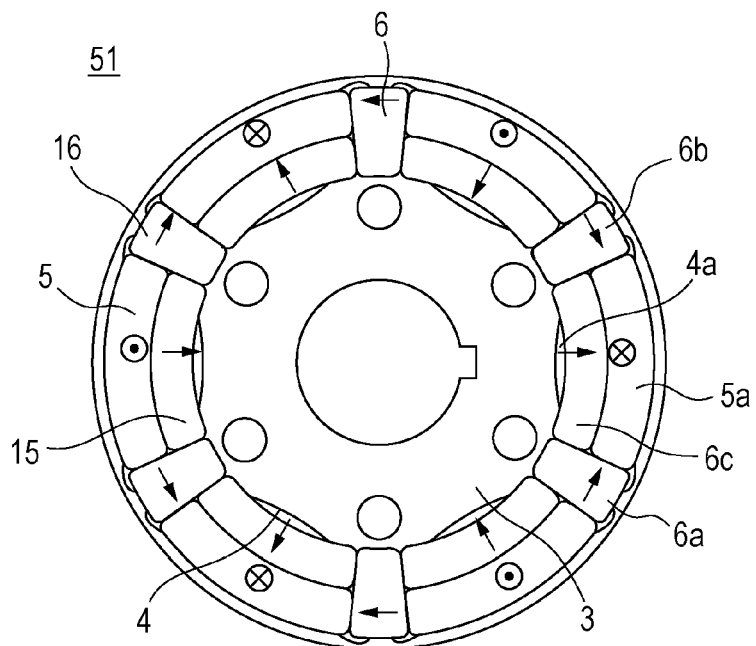
FIG. 16 is a plan view of a rotor of a permanent magnet synchronous machine according to a fifth embodiment of the present disclosure.

Referring to FIG. 16, the structure of a rotor according to a fifth embodiment of the present disclosure will be described. FIG. 16 is a plan view of a rotor 51 according to the fifth embodiment. In order to illustrate the arrangement of permanent magnets, a rotor yoke and a rotor end plate are omitted from FIG. 16.

The fifth embodiment differs from the first embodiment in that not only second permanent magnets 6a and 6b but also second permanent magnets 6c are provided. The second permanent magnets 6a and 6b, which generate magnetic fluxes in the circumferential direction perpendicular to the rotation axis, are disposed between the magnetic poles of the first permanent magnets 5. The second permanent magnets 6c, which generate magnetic fluxes inward in the radial direction, are disposed inward in the radial direction of the first permanent magnets 5. The second permanent magnet 6c corresponds to a third permanent magnet of the present disclosure. The rotor 51 has a rotor core body 3 having a structure the same as that of the rotor core body 3 according to any one of the first to fourth embodiments.

Ferrite magnets, each of which is inverted-arc shaped, are used as the main permanent magnets 4. Overhangs of the rotor 51 each include first permanent magnets 5 and second permanent magnets 6. The first permanent magnets 5 generate magnetic fluxes in the axial direction. The second permanent magnets 6 generate magnetic fluxes in directions perpendicular to the rotation axis. The first and second permanent magnets 5 and 6 are Sm—Co magnets, which are rare-earth magnets.

In FIG. 16, the direction of a magnetic flux generated by each of the permanent magnets 4 to 6 is indicated by an arrow, by a dot if the direction is perpendicularly out of the plane of FIG. 16, or by "x" if the direction is perpendicularly into the plane of FIG. 16. On each region of an end surface of a rotor core body 3 adjacent to a region in which a main permanent magnet 4a forms a north pole on the outer peripheral surface of the rotor, the north pole of a first permanent magnet 5a is disposed behind the plane of FIG. 16 so that the first permanent magnet 5a generates a magnetic flux extending from the end surface of the rotor core body 3 into the rotor core body 3. The north poles of the second permanent magnets 6a, 6b, and 6c, which are disposed adjacent to the poles of the first permanent magnet 5a, are disposed so that the second permanent magnets 6a, 6b, and 6c generate magnetic fluxes toward the first permanent magnet 5a.

The sub-permanent magnets 5 and 6 are disposed on the end surface of the rotor core body 3, and a rotor yoke 8 is disposed on end surfaces of the sub-permanent magnets 5 and 6. The rotor yoke 8 is made of a magnetic material (for example, pure iron SUY-1 or carbon steel S45C). A rotor end plate 9, which is cup-shaped and made of a nonmagnetic material (for example, austenitic stainless steel SUS304), covers the rotor yoke 8 and the sub-permanent magnets 5 and 6, and the rotor yoke 8 is fastened in the axial direction with rivets or bolts.

Figure 17:
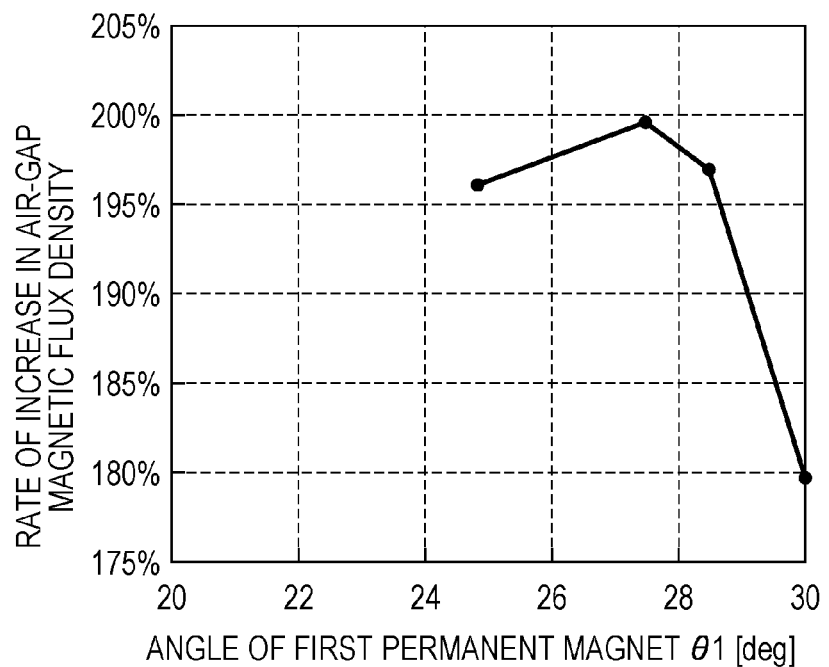
FIG. 17 is a graph representing the rate of increase in the air-gap magnetic flux density due to sub-permanent magnets according to the fifth embodiment of the present disclosure.

FIG. 17 is a graph representing the rate of increase in the air-gap magnetic flux density according to the fifth embodiment. The horizontal axis represents the angle of an arc between the center of a magnetic pole and an end of the first permanent magnet 5. As with FIG. 8A, FIG. 17 is based on the structure illustrated in FIG. 8B. Also in the fifth embodiment, one pole corresponds to an angle of 30 degrees.

In the structure of the fifth embodiment, when the angle of the first permanent magnet 5 is 26.5 degrees (when, the first permanent magnet in one pole has 53 degrees and the second permanent magnets in one pole each has 3.5 degrees), the rate of increase in the magnetic flux density at the center of the air gap due to the sub-permanent magnets 5 and 6 is 200%. When the angle of the first permanent magnet 5 is 30 degrees (when all of the sub-permanent magnets are first permanent magnets, which generate magnetic fluxes in the axial direction), the rate of increase in the magnetic flux density at the center of the air gap is 180%. It is possible to increase the magnetic flux density at the center of the air gap and to increase the effective magnetic flux by using, as sub-permanent magnets, the second permanent magnets 6, which form magnetic fluxes in directions perpendicular to the rotation axis, in addition to the first permanent magnets 5, which form magnetic fluxes in the axial direction.

Moreover, in the fifth embodiment, in addition to the second permanent magnets 6a and 6b, which generate magnetic fluxes in the circumferential direction, the second permanent magnets 6c, which generate magnetic fluxes in the radial direction, are disposed inside of the first permanent magnet 5 in the radial direction. As a result, it is possible to increase effective magnetic flux further than the first embodiment.

Sixth Embodiment

Figure 18A:
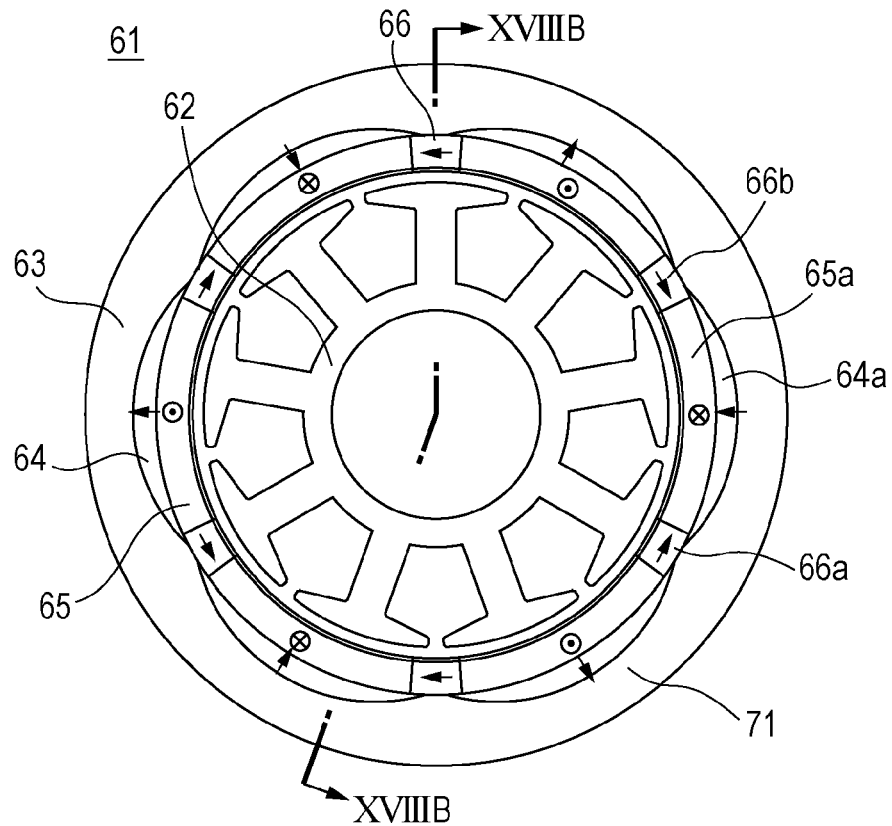
FIGS. 18A and 18B are respectively a plan view and an axial sectional view of a rotor of a permanent magnet synchronous machine according to a sixth embodiment of the present disclosure.
Figure 18B:
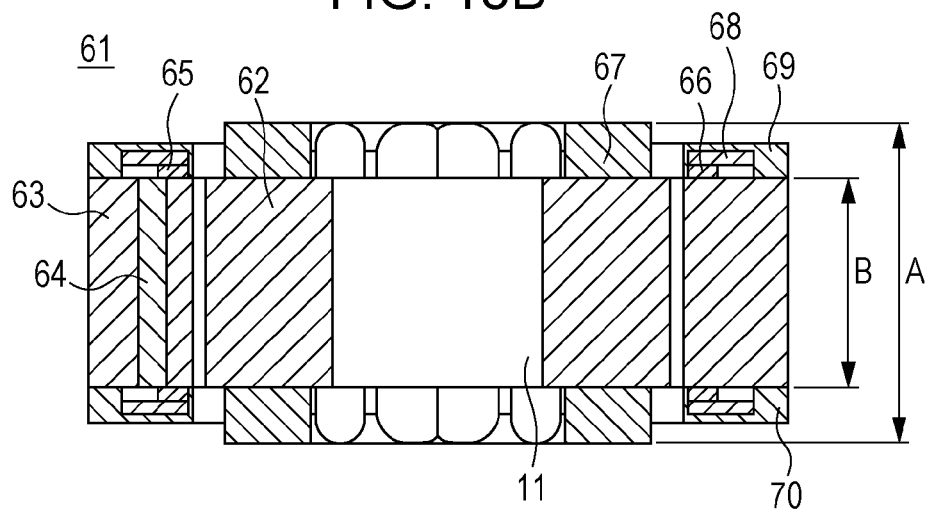

FIG. 18A is a plan view of a permanent magnet synchronous machine according to a sixth embodiment of the present disclosure. FIG. 18B is an axial sectional view taken along line XVIIIB-XVIIIB of FIG. 18A. For simplicity, a stator coil, a rotor yoke, and a rotor end plate, which are illustrated in FIG. 18B, are not illustrated in FIG. 18A. FIGS. 18A and 18B illustrate an example of an outer-rotor permanent magnet synchronous machine, in which a rotor is rotatably disposed outside of a stator.

In a permanent magnet synchronous machine 61 according to the sixth embodiment, a stator core 62 includes stator teeth extending from an annular stator yoke outward in the radial direction. The stator core 62 is made by laminating electrical steel sheets in the axial direction. In stator slots between the stator teeth, stator coils 67 are disposed with insulators (not shown) interposed between the stator teeth and the stator coils 67 (see FIG. 18B). Although the stator coils 67 are not shown in FIG. 18A, each of the stator coils 67 is concentratedly wound around a corresponding one of the stator teeth.

In FIG. 18B, the length of the stator in the axial direction is denoted by A, and the length of the stator core in the axial direction is denoted by B. Overhangs of the rotor extend to spaces having a length that is equal to the difference between the length A of the stator and the length B of the stator core (spaces located outward in the radial direction of the coil end). A rotor 71 includes a rotor core body 63, which is made by laminating electrical steel sheets in the axial direction. Main permanent magnets 64 are embedded in six permanent magnet insertion holes formed in the rotor core body 63. Thus, six magnetic poles are formed on an inner peripheral surface of the rotor 71. The main permanent magnets 64 may be inverted-arc-shaped ferrite magnets. Overhangs 70 of the rotor 71 each include first permanent magnets 65 and second permanent magnets 66. The first permanent magnets 65 generate magnetic fluxes in the axial direction. The second permanent magnets 66 generate magnetic fluxes in directions perpendicular to the rotation axis. The first and second permanent magnets 65 and 66 may be samarium-cobalt magnets (Sm—Co magnets), which are rare-earth magnets.

First permanent magnet 65a is disposed so as to generate a magnetic flux extending from an end surface of the rotor core body 63 into of the rotor core body 63. In other words, the north poles of the first permanent magnets 65a face the end surface. Second permanent magnets 66*a* and 66*b* are disposed adjacent to the first permanent magnets 65*a* so as to generate magnetic fluxes toward the first permanent magnets 65*a*.

Thus, the sub-permanent magnets 65 and 66 are disposed on an end surface of the rotor core body 63, and a rotor yoke 68, which is annular, is disposed on end surfaces of sub-permanent magnets 65 and 66. The rotor yoke 68 is made of a magnetic material (for example, pure iron SUY-1 or carbon steel S45C). A rotor end plate 69, which is cup-shaped and made of a nonmagnetic material (for example, austenitic stainless steel SUS304), covers the rotor yoke 68 and the sub-permanent magnets 65 and 66, and the rotor yoke 68 is fastened in the axial direction with rivets or bolts.

Figure 19:
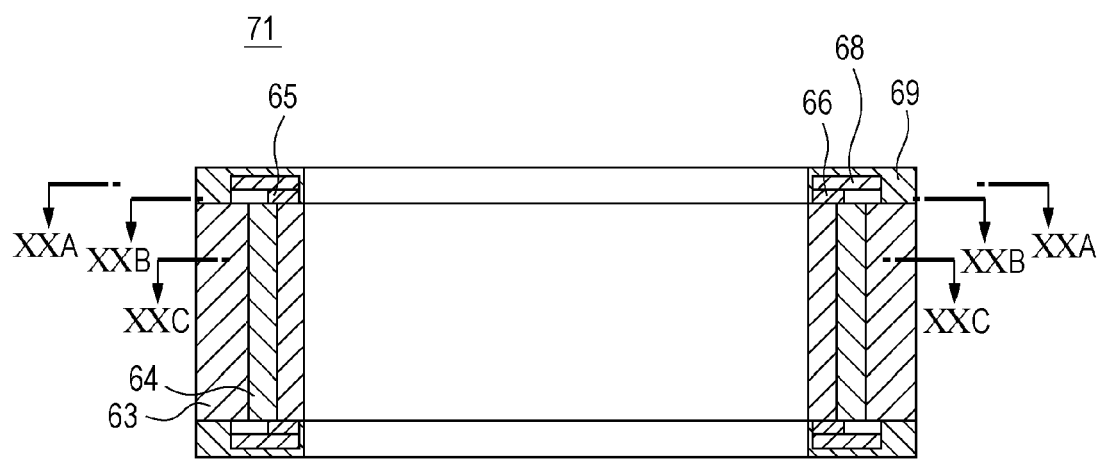
FIG. 19 is an axial sectional view of a rotor of the permanent magnet synchronous machine according to the sixth embodiment of the present disclosure.
Figure 20A:
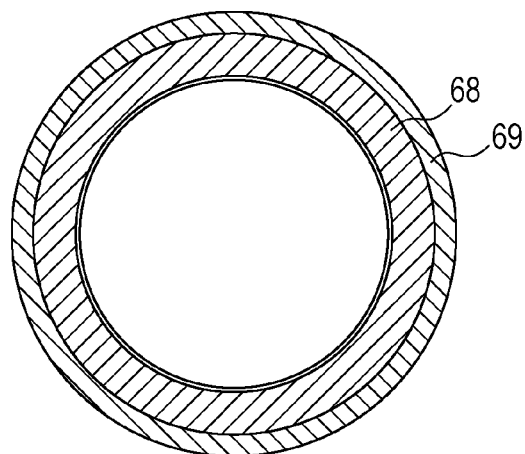
FIGS. 20A to 20C are cross-sectional views of the rotor of the permanent magnet synchronous machine according to the sixth embodiment of the present disclosure.
Figure 20B:
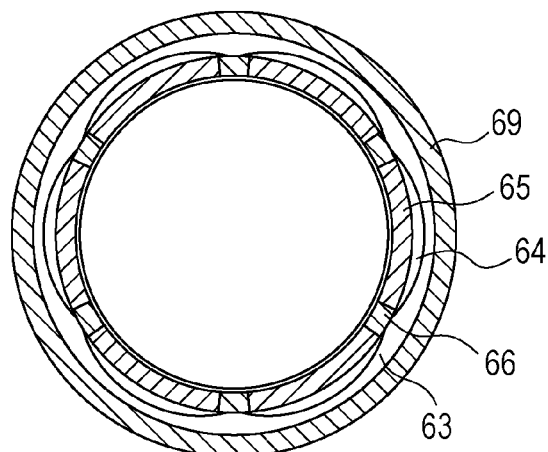
Figure 20C:
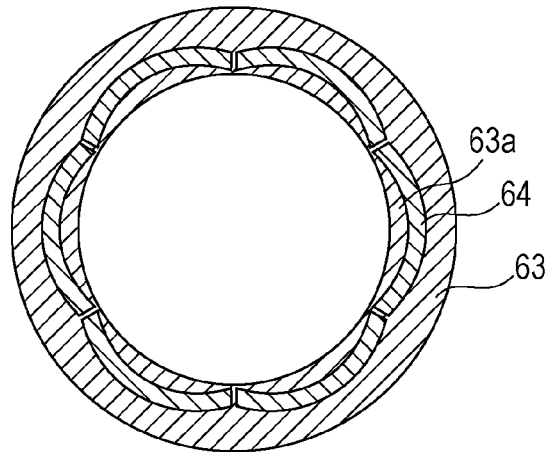

FIG. 19 is an axial sectional view of the rotor of the permanent magnet synchronous machine according to the sixth embodiment of the present disclosure. FIGS. 20A to 20C are cross-sectional views of the rotor of the permanent magnet synchronous machine according to the sixth embodiment of the present disclosure. FIG. 20A illustrates a cross section taken along line XXA-XXA of FIG. 19, FIG. 20B illustrates a cross section taken along line XXB-XXB of FIG. 19, and FIG. 20C illustrates a cross section taken along line XXC-XXC of FIG. 19. As can be seen from FIG. 20C, six main permanent magnets 64, each being inverted-arc shaped, are disposed in the rotor core body 63.

The magnetic poles of the rotor core have inner peripheries 63*a*. FIG. 20B is a cross-sectional view illustrating an overhang of the rotor, including the sub-permanent magnets. As illustrated in FIG. 20C, the first permanent magnets 65 are disposed on end surfaces of the main permanent magnets 64 and the inner peripheries 63*a* of the rotor magnetic core. The second permanent magnets 66 are disposed between the poles of the first permanent magnets 65. The rotor end plate 69, which is cup-shaped, covers the outer peripheries of the first permanent magnets 65 and the second permanent magnets 66.

FIG. 20A is a cross-sectional view illustrating an overhang of the rotor, including the rotor yoke 68. The rotor yoke 68, which is annular, is disposed on end surfaces of the first permanent magnets 65 and the second permanent magnets 66 illustrated in FIG. 20B. The rotor end plate 69, which is cup-shaped, covers the outer periphery of the rotor yoke 68.

As can be seen from FIG. 18B, which is an axial sectional view, the structure according to the sixth embodiment can be realized even in a case where the amount of overhang of the rotor is small, that is, the length of the overhangs at ends of the rotor core is not sufficient. Such a case occurs if, for example, if there is not a sufficient distance between a rotor core and a bearing of a permanent magnet synchronous machine that includes a concentrated-winding stator and that has a small length in the axial direction. As a result, even in such a case, it is possible to provide a permanent magnet synchronous machine that is lightweight, that has small inertia, and that has a high power. Moreover, because ferrite magnets are used as the main permanent magnets and samarium-cobalt magnets are used as the sub-permanent magnets, it is possible to provide a permanent magnet synchronous machine having higher heat resistance at a lower cost than synchronous machines using neodymium magnets.

Although concentrated-winding coils are used as examples of the stator coils in the sixth embodiment, the stator coils may be distributed-winding coils. The permanent magnets need not be a combination of ferrite magnets and Sm—Co magnets. The rotor end plate of the overhang of the rotor may be configured to function as a balance weight. In this case, it is possible to provide a permanent magnet synchronous machine that operates stably.

In the sixth embodiment, the permanent magnet synchronous machine is of an outer-rotor type in which a rotor is disposed outside of a stator. In each of the second to fifth embodiments, the permanent magnet synchronous machine may be of an outer-rotor type as in the sixth embodiment.

In each of the first to sixth embodiments, the stator core, the rotor core body, and the rotor yoke may be dust cores. In this case, eddy-current loss can be reduced. The main permanent magnets need not be inverted-arc shaped, and may be rectangular. The number of permanent magnets in one pole need not be one, and a plurality of permanent magnets may be arranged in a V-shaped pattern, a V-shaped pattern, or in multiple layers. In each of the first to sixth embodiments, instead of forming magnetic poles by the main permanent magnets disposed in the rotor core body, magnetic poles may be formed by permanent magnets disposed on an end surface of the rotor core body.

The first to sixth embodiments are particularly effective for a permanent magnet synchronous machine that has a concentrated-winding stator and has a small length in the axial direction or a permanent magnet synchronous machine in which there is not a sufficient distance between a rotor core and a bearing. If overhangs of the rotor are excessively long in the axial direction, the weight and the inertia of the rotor is increased. Therefore, deterioration of characteristics or increase in the cost due to increase in the amount of permanent magnets may occur. The first to sixth embodiments can solve such problems. In high-power permanent magnet synchronous machines that are used in an environment in which heat resistance is needed, rare-earth magnets are usually used as main permanent magnets. In this case, there is a problem in that supply of dysprosium (Dy) used in such rare-earth permanent magnets is unstable and therefore the cost of such magnets is high. In each of the first to sixth embodiment of the present disclosure, rare-earth magnets are used only as the sub-permanent magnets. Therefore, the amount of dysprosium used in a synchronous machine can be reduced.

A permanent magnet synchronous machine according to the present disclosure can increase the amount of effective magnetic flux into the rotor core body as compared with existing machines even if the length of the overhang of the rotor is small. Therefore, the permanent magnet synchronous machine can be effectively used as a small and high-power permanent magnet synchronous machine.

What is claimed is:

1. A permanent magnet synchronous machine comprising:
a stator; and
a rotor including a plurality of magnetic poles each facing the stator with an air gap therebetween and each generating a magnetic flux in a radial direction,
wherein the stator includes
a core including a plurality of teeth, and
a coil wound around each of the plurality of teeth,
wherein the rotor includes
a core body comprising a pair of end surfaces perpendicular to a rotation axis and a surface on which a north pole and a south pole included in the plurality of magnetic poles are alternately arranged in a circumferential direction, and
an overhang disposed on each end surface of the core body and protruding further in a direction of the rotation axis than the core of the stator,
wherein each end surface of the core body includes an N-region located on the north pole included in the magnetic poles, and an S-region located on the south pole included in the magnetic poles, wherein the overhang includes a plurality of first permanent magnets arranged on the end surface of the core body along an outer edge of the end surface with distances therebetween, and a plurality of second permanent magnets disposed on the end surface of the core body and adjacent to the first permanent magnets, wherein the plurality of first permanent magnets include at least one of a permanent magnet comprising a north pole facing the N-region of the end surface, and a permanent magnet comprising a south pole facing the S-region of the end surface, and wherein the second permanent magnets are provided in the configuration which causes the second permanent magnets to generate a magnetic flux extending from the S-region toward the N-region of the end surface.

2. The permanent magnet synchronous machine according to claim 1, wherein the rotor further includes a rotor yoke that covers sides of the plurality of first permanent magnets, the sides being opposite to sides facing the end surface, and the rotor yoke magnetically couples the plurality of first permanent magnets to each other.

3. The permanent magnet synchronous machine according to claim 2, wherein the rotor further includes a rotor end plate that is cup-shaped and made of a nonmagnetic material, and the rotor end plate has a groove that holds the first permanent magnets, the second permanent magnet, and the rotor yoke.

4. The permanent magnet synchronous machine according to claim 2, wherein the rotor further includes a rotor end plate that is disk-shaped and made of a nonmagnetic material, and the rotor end plate has a hole that holds the first permanent magnets and the second permanent magnets.

5. The permanent magnet synchronous machine according to claim 2, wherein the rotor yoke includes a first portion that covers the plurality of first permanent magnets and a second portion that expands from the first portion in the radial direction.

6. The permanent magnet synchronous machine according to claim 2, wherein, on each of the pair of end surfaces, the plurality of first permanent magnets include only one of the permanent magnet comprising a north pole facing the N-region of the end surface and the permanent magnet comprising a south pole facing the S-region of the end surface, and the second permanent magnets are disposed on a region across a boundary between the N-region and the S-region, and adjacent to at least one of the plurality of first permanent magnets in the circumferential direction, and wherein the rotor yoke magnetically couples the plurality of first permanent magnets to regions of the end surface on which the first permanent magnets are not disposed.

7. The permanent magnet synchronous machine according to claim 6, wherein some of the plurality of first permanent magnets disposed on one of the pair of end surfaces comprise north poles facing the one of the end surfaces, and wherein some of the plurality of first permanent magnets disposed on the other of the pair of end surfaces comprise south poles facing the other of the end surfaces.

8. The permanent magnet synchronous machine according to claim 1, wherein the overhang of the rotor further includes a plurality of third permanent magnets disposed on a region of each end surface, the plurality of third permanent magnets being located in the radial direction from the plurality of first permanent magnets, and wherein the third permanent magnets are provided in the configuration which causes the third permanent magnets to generate a magnetic flux in the radial direction.

9. The permanent magnet synchronous machine according to claim 1, wherein the second permanent magnets are disposed on a portion of each end surface between the N-region and the S-region, and wherein north poles of the second permanent magnets faces the N-region of the end surface and south poles of the second permanent magnets faces the S-region of the end surface.

10. The permanent magnet synchronous machine according to claim 1, wherein the plurality of first permanent magnets are disposed on the N-region or the S-region of each end surface of the core body.

11. The permanent magnet synchronous machine according to claim 3, wherein the rotor end plate functions as a balance weight.

12. The permanent magnet synchronous machine according to claims 1, wherein the core body of the rotor includes a plurality of ferrite magnets that form the plurality of magnetic poles, and wherein the plurality of first permanent magnets and the plurality of second permanent magnets are samarium-cobalt magnets.

\* \* \* \* \*